United States Patent
Lange et al.

(10) Patent No.: US 9,475,580 B2
(45) Date of Patent: Oct. 25, 2016

(54) VEHICLE COMPRISING A TRANSPORT ARRANGEMENT

(71) Applicant: Airbus Operations GmbH, Hamburg (DE)

(72) Inventors: Roland Lange, Nottensdorf (DE); Stefan Ebeling, Wilhelmshaven (DE); Jens Gärtner, Hamburg (DE); Andreas Köhler, Hamburg (DE); Raj Kotian, Hamburg (DE); Horst Warninck, Rostock (DE); Ralf Schliwa, Dollern (DE)

(73) Assignee: Airbus Operations GmbH (DE)

( * ) Notice: Subject to any disclaimer, the term of this patent is extended or adjusted under 35 U.S.C. 154(b) by 2 days.

(21) Appl. No.: 14/306,487

(22) Filed: Jun. 17, 2014

(65) Prior Publication Data

US 2014/0367516 A1    Dec. 18, 2014

(30) Foreign Application Priority Data

Jun. 17, 2013  (EP) .................................. 13172368

(51) Int. Cl.
*B64D 9/00*  (2006.01)
*B64D 11/04*  (2006.01)
(Continued)

(52) U.S. Cl.
CPC ................ *B64D 9/00* (2013.01); *B64D 11/04* (2013.01); *B65D 88/14* (2013.01); *B65D 90/0073* (2013.01); *B65D 2590/0066* (2013.01)

(58) Field of Classification Search
CPC .......... B64D 9/00; B64D 9/03; B64D 11/04; B64D 11/0007; B60P 7/13; B65D 88/14; B65D 90/0073

USPC ........................................ 414/277, 280, 281
See application file for complete search history.

(56) References Cited

U.S. PATENT DOCUMENTS

| 5,074,496 A | * | 12/1991 | Rezag | .................. B65G 1/0407 |
|  |  |  |  | 105/327 |
| 5,322,244 A | * | 6/1994 | Dallmann | .............. B64D 11/04 |
|  |  |  |  | 244/118.1 |

(Continued)

FOREIGN PATENT DOCUMENTS

| DE | 43 02 706 A1 | 8/1994 |
| DE | 199 04 906 A1 | 8/2000 |

(Continued)

OTHER PUBLICATIONS

EP 13 17 2368 Search Report (Dec. 11, 2013).

(Continued)

*Primary Examiner* — Kaitlin Joerger
(74) *Attorney, Agent, or Firm* — Lerner, David, Littenberg, Krumholz & Mentlik, LLP

(57) ABSTRACT

A vehicle includes a passenger compartment and a cargo compartment separated by a floor structure, and a cargo unit including a storage rack arrangement and a transport arrangement operable for selectively transporting objects between the storage rack arrangement and a predetermined transfer position in a cavity of the cargo unit. The transport arrangement includes a conveying apparatus including a table unit movable along a vertical transport path, and the vehicle includes a mounting means adapted for securing the cargo unit in a predetermined operating position inside the cargo compartment, in which an access aperture in an upper cover of the cargo unit is disposed in alignment with a through hole in the floor structure. A lift apparatus including a gripping device is operable to convey objects from the transfer position through the access aperture and the through hole between the cargo compartment and the passenger compartment.

18 Claims, 16 Drawing Sheets

(51) Int. Cl.
*B65D 88/14* (2006.01)
*B65D 90/00* (2006.01)

(56) References Cited

U.S. PATENT DOCUMENTS

| | | | | |
|---|---|---|---|---|
| 5,496,000 | A * | 3/1996 | Mueller | B64D 11/0007 104/88.01 |
| 6,152,287 | A * | 11/2000 | Luria | B64D 9/00 198/465.1 |
| 6,412,603 | B1 * | 7/2002 | Nervig | B64D 9/003 187/267 |
| 6,454,208 | B1 * | 9/2002 | Nervig | B64D 9/003 244/118.1 |
| 6,663,043 | B1 * | 12/2003 | Luria | B64D 9/00 244/118.1 |
| 6,776,263 | B2 * | 8/2004 | Gottlieb | B64D 9/00 187/251 |
| 6,808,142 | B2 * | 10/2004 | Oki | B64C 1/20 244/118.1 |
| 6,923,612 | B2 * | 8/2005 | Hansl | B66F 9/07 414/277 |
| 7,086,677 | B2 * | 8/2006 | Boe | B64D 9/00 294/68.3 |
| 7,137,593 | B2 * | 11/2006 | Baatz | B64D 11/04 198/468.8 |
| 8,011,617 | B2 * | 9/2011 | Curry | B64C 1/20 244/118.1 |
| 8,596,952 | B2 * | 12/2013 | Wolkerstorfer | B65G 1/0435 414/280 |
| 8,740,542 | B2 * | 6/2014 | Wolkerstorfer | B65G 1/0435 414/280 |
| 8,753,060 | B2 * | 6/2014 | Ueda | B65G 1/0421 198/346.2 |
| 8,757,327 | B2 * | 6/2014 | Ehlert | B64C 1/22 187/250 |
| 8,790,061 | B2 * | 7/2014 | Yamashita | B65G 1/0492 414/280 |
| 8,956,099 | B2 * | 2/2015 | Olszak | B66F 9/07 414/277 |
| 8,979,025 | B1 * | 3/2015 | Curry | B64C 1/20 244/118.1 |
| 9,096,317 | B2 * | 8/2015 | Huber | B64D 9/00 |
| 2001/0045326 | A1 * | 11/2001 | Gottlieb | B64D 9/00 187/254 |
| 2003/0091411 | A1 * | 5/2003 | Diehm | B65G 1/0435 414/280 |
| 2005/0230540 | A1 | 10/2005 | Harrington et al. | |
| 2013/0259612 | A1 | 10/2013 | Guering | |
| 2014/0367055 | A1 * | 12/2014 | Ebeling | E06B 9/262 160/84.06 |
| 2014/0367220 | A1 * | 12/2014 | Lange | B65D 88/14 198/347.2 |
| 2014/0367518 | A1 * | 12/2014 | Lange | B64D 11/0007 244/118.5 |
| 2015/0028157 | A1 * | 1/2015 | Hoogeveen | B64D 11/0007 244/118.1 |

FOREIGN PATENT DOCUMENTS

EP     0 443 897 A1     8/1991
WO     2012/025673 A1     3/2012

OTHER PUBLICATIONS

EP 14172748.7 Search Report (Oct. 21, 2014).

* cited by examiner

VEHICLE COMPRISING A TRANSPORT ARRANGEMENT

FIELD OF THE INVENTION

The present application relates to a vehicle comprising a passenger compartment and a cargo compartment disposed below the passenger compartment and separated from the passenger compartment by a floor structure having a through hole communicating the passenger compartment with the cargo compartment, and a lift apparatus comprising a gripping device and operable to move the gripping device in a direction perpendicular to the floor structure in order to convey objects stored in a cargo unit, such as a cargo container, secured or installed in the cargo compartment from the cargo unit in the direction perpendicular to the floor structure through an access aperture in the upper cover of the cargo unit and the through hole in the floor structure between the cargo compartment and the passenger compartment and vice versa.

BACKGROUND OF THE INVENTION

Aircraft typically comprise several distinct compartments separated from each other by wall structures. In particular, such compartments generally comprise compartments arranged one above the other and separated by a floor structure, for example a passenger compartment arranged above a cargo compartment or cargo bay. In this connection it may be desirable to utilize, process or handle objects in a monument mounted in the upper compartment, but to store these objects in the lower compartment prior to their use, processing or handling in order to maximize the space available in the upper compartment.

In the case of the upper compartment being a passenger compartment storing such objects in the lower compartment pro-vides the advantage of maximizing the space available for seating passengers, thereby increasing profitability and flexibility in selecting an optimum cabin arrangement. Further, in the case of the lower compartment being a cargo compartment the advantage is provided that loading the objects into the aircraft is facilitated and may be carried out in accordance with standard cargo loading procedures.

One particular example for this situation is a monument which is an aircraft galley. Such galley is mounted on a floor structure in the passenger compartment of an aircraft, and the catering goods, such as food and beverages, are often loaded in boxes and/or trolleys into the aircraft and stored in a storage rack arrangement in the galley or in a separate storage rack arrangement located within the passenger compartment. Thus, in this case considerable passenger compartment space is wasted by a storage rack arrangement. It has, therefore, been suggested to dispense with the storage rack arrangement in the passenger compartment, and to utilize instead a storage rack arrangement located in the cargo compartment below the passenger compartment. In particular, such storage rack arrangement may be provided in a removable cargo container, which can be loaded into the cargo compartment together with other conventional cargo containers. Thus, boxes and trolleys with catering goods can advantageously be stored into the storage rack arrangement outside the aircraft.

In any case, it is necessary to provide for a mechanism for vertically lifting objects to be utilized, processed or handled in or by the monument mounted in the upper compartment from the lower compartment, i.e. in a direction perpendicularly or transversely to the floor structure. For this purpose, an aperture or opening is provided in a portion of the floor structure below the monument. A manual or automatic means must be provided for placing objects to be lifted at a defined location in the lower compartment where they can be engaged or grabbed by the lifting mechanism, or the lifting mechanism must be movable in the horizontal direction, i.e. along the extension of the floor structure. In the example of the galley and the use of a storage rack arrangement in a cargo container an opening or aperture must be provided in the upper wall portion of the container to allow for access to the lifting mechanism to the boxes and/or trolleys stored inside the container.

Similar considerations also apply to other types of vehicles.

System of the above type must be constructed to reliably function during operation of the respective vehicle, such as under aircraft specific boundary conditions, i.e. during different flight phases and under large temperature fluctuations and large stress.

BRIEF SUMMARY OF THE INVENTION

An aspect of the present invention provides a vehicle of the above type which ensures reliable storage of objects in a cargo unit secured or installed in the cargo compartment from the cargo unit and reliable operation of the lifting apparatus for conveying objects stored in the cargo unit from the cargo unit in the direction perpendicular to the floor structure through an access aperture in the upper cover of the cargo unit and the through hole in the floor structure between the cargo compartment and the passenger compartment and vice versa.

According to an embodiment of the present invention a vehicle comprises a passenger compartment and a cargo compartment disposed below the passenger compartment and separated from the passenger compartment by a floor structure having a through hole communicating the passenger compartment with the cargo compartment.

The vehicle further comprises a cargo unit having a housing including a base plate, a sidewall arrangement extending from the base plate and an upper cover and defining an interior cavity. The sidewall arrangement may comprise one or more individual sidewalls, and each of them may preferably extend perpendicularly to the base plate. In particular, the sidewall arrangement may comprise four sidewalls connected to each other in a rectangular configuration. The upper cover is connected to the sidewall arrangement at an end of the sidewall arrangement opposite from the base plate. Throughout the present application terms like "upper", "lower", "horizontal", "vertical" and "side" relate to the orientation of a component intended during normal operation. In the case of the cargo unit the upper cover is positioned above the base plate when the base plate rests on the ground or a flat horizontal plane. In that condition the base plate extends horizontally.

The cargo unit is preferably a cargo container or unit load device, more preferably a standard unit load device, such as an LD3 container.

In any case, the base plate defines a horizontal plane of the cargo unit and extends perpendicularly to a vertical direction of the cargo unit, i.e. regardless of the actual orientation of the cargo unit in space the vertical direction is defined to be perpendicular to the base plate and the horizontal plane is defined to be a plane in which the base plate extends.

The upper cover includes an access aperture, which may, e.g., have a square, rectangular, circular or oval shape.

At least one storage rack arrangement is disposed in the cavity of the cargo unit and adapted for storing a plurality of objects. For example, a single storage rack arrangement may be disposed inside a cavity, but in a preferred embodiment two storage rack arrangements are disposed inside the cavity.

Further, a transport arrangement is disposed in the cavity and operable for selectively transporting objects between the storage rack arrangement and a predetermined transfer position in the cavity. In embodiments in which two storage rack arrangements are disposed inside the cavity it is preferred for the transport arrangement to be disposed between the two storage rack arrangements. The transport arrangement comprises a conveying apparatus and a control unit adapted for automatically controlling and operating the conveying apparatus.

A mounting means is disposed in the cargo compartment and adapted for fixedly or releasably securing the cargo unit in a predetermined operating position inside the cargo compartment, in which the access aperture in the upper cover of the cargo unit is disposed adjacent to and in alignment with the through hole in the floor structure. In particular, the access aperture and the through hole are arranged on a common axis extending perpendicularly to the floor structure. It is preferred that the mounting means is adapted for releasably securing the cargo unit in the predetermined operating position. The cargo unit is then a cargo container which can be loaded into the cargo compartment and unloaded from the cargo compartment. However, it is also possible that the cargo unit in its entirety or at least a portion thereof is fixedly secured to the cargo compartment or vehicle. In other words, the cargo unit or a part of the cargo unit is then fixedly installed in the cargo compartment, and the mounting means is constituted by the means fixedly securing the cargo unit or the part of the cargo unit in the cargo compartment. In this regard, it can be advantageously provided that only a portion of the cargo unit is fixedly installed in the cargo compartment and that other portions or components of the cargo unit are selectively removable from the remainder of the cargo unit and from the cargo compartment. In particular, the base plate or at least the base plate may be fixedly installed in the cargo compartment. Then, other components and elements of the cargo unit are preferably fixedly or releasably secured to the base plate.

Further, a lift apparatus is provided comprising a gripping device suspended from a gripping device mounting means, i.e. when looking from the upper compartment in the direction of the lower compartment the gripping device is arranged below the gripping device mounting means. The lift apparatus is disposed at least partially in the passenger compartment. It is arranged and adapted such that the lift apparatus is operable to move the gripping device in a direction perpendicular to the floor structure and, when the cargo unit is secured by the mounting means in the operating position, to thereby convey objects in the direction perpendicular to the floor structure from the transfer position in the cargo unit through the access aperture in the upper cover and the through hole in the floor structure between the cargo compartment and the passenger compartment and vice versa.

The transport arrangement comprises a horizontal guide means defining a linear horizontal transport path extending perpendicularly to the vertical direction of the cargo unit and supporting the conveying apparatus such that it is movable in a guided manner along the horizontal transport path. A horizontal drive means is provided which is operable for selectively moving the conveying apparatus along the horizontal transport path. In a preferred embodiment the horizontal drive means comprises an electric motor, but it may alternatively or additional also include, e.g., pneumatic or hydraulic means. In a preferred embodiment the horizontal guide means comprises one or more guide rails engaging the conveying apparatus or elements supporting the conveying apparatus.

The conveying apparatus also comprises one or more table units adapted for supporting an object thereon, preferably at least two table units and more preferably exactly two table units. By providing two or more table units one can obtain the advantage that even if one table unit fails it is still possible to reach all positions in the cargo unit relevant for transporting objects between the at least one storage rack arrangement and the predetermined transfer position. This is particularly the case for embodiments in which two identical table units are provided, as described further below. Thus, when providing two or more table units, one or more of the table units can serve as backup table units.

Further, the conveying apparatus comprises a vertical guide means defining a linear vertical transport path extending parallel to the vertical direction of the cargo unit and supporting the at least one table unit such that it is movable in a guided manner along the vertical transport path. A vertical drive means is provided which is operable for selectively moving the at least one table unit along the vertical transport path. In a preferred embodiment the vertical drive means comprises an electric motor, but it may alternatively or additional also include, e.g., pneumatic or hydraulic means. In a preferred embodiment the vertical guide means comprises a spindle on which the at least one table unit is carried such that rotation of the spindle effects movement of the at least one table unit in the vertical direction.

Each of the at least one storage rack arrangement comprises a plurality of rack compartments each adapted for storing an object and having an access opening through which objects are insertable into and removable from the respective rack compartment. The access openings are provided in an access side of the storage rack arrangement extending parallel to the horizontal transport path, in particular in a lateral surface of the storage rack arrangement facing transversely or perpendicularly to the vertical direction. The rack compartments are preferably of identical dimensions and shape. Further, in each storage rack arrangement the rack compartments are preferably arranged in a matrix pattern in horizontal rows and vertical columns.

The transport arrangement is disposed facing the access side (or the corresponding lateral surface) of each of the at least one storage rack arrangement in such a manner that by operating the horizontal and vertical drive means the at least one table unit is selectively movable in front of each of the rack compartments and operable to move an object from the respective rack compartment onto the at least one table unit and support it on the at least one table unit and to release an object supported on the at least one table unit and move it from the at least one table unit into the respective rack compartment. In the case of more than one table unit the table units and the rack compartments are preferably arranged such that if one of the table units is positioned in front of a rack compartment the other table units are positioned in front of others of the rack compartments of the same or a different storage rack arrangement. Rack compartments arranged in a matrix pattern in horizontal rows and vertical columns facilitates positioning the table unit or the table units in front of a selected one of the rack compartments or selected ones of the rack compartments.

The gripping device is adapted such that it can be selectively switched between a gripping state, in which, with respect to the gripping device mounting means, it is movable along and rotatable about two perpendicular axes, each perpendicular to the direction perpendicular to the floor structure, and a lift state, in which it is locked in a predetermined lift position against movement with respect to the gripping device mounting means.

The above vehicle provides the advantage that it is of simple and reliable construction and can be reliably operated during operation of the vehicle. Due to the fact that each of the rack compartments can be directly accessed by one of the table units objects can be quickly conveyed from the rack compartments to the transfer position and vice versa. Further, the gripping device provides tolerance compensation against relative movement of parts of the vehicle under stresses occurring during vehicle operation and resulting in a relative displacement between the transfer position and the lift apparatus. Thus, jamming of the lift apparatus and the cargo unit is reliably prevented.

In a preferred embodiment the at least one table unit and the gripping device are adapted to support objects and grip objects, respectively, in the form of receptacles having a predetermined shape and predetermined dimensions. Further, in each of the at least one storage rack arrangement the rack compartments are of identical shape and dimensions and adapted to receive exactly one of the receptacles and support the respective receptacle in a predetermined position and orientation inside the respective rack compartment. In this manner, the table units advantageously do not have to be adapted for handling objects of different construction, thereby simplifying the construction and operation of the table units and the conveying apparatus as a whole. Different objects can be placed inside the receptacles, so that the receptacles can be regarded as adapters for different kinds of objects. In the present application the term "receptacle" also includes open constructions like cage constructions.

In a preferred embodiment the horizontal guide means comprises a guide rail arrangement and/or the vertical guide means comprises a rotatable spindle. In case of a rotatable spindle it is preferred to provide two table units, symmetrically disposed on different sides of the spindle. This provides for an advantageous distribution of loads caused by the table units.

In a preferred embodiment the conveying apparatus comprises at least two identical table units disposed next to each other at the same vertical position, and the vertical drive means is adapted to synchronously move the at least two table units in the vertical direction. Similar to the specific case of the vertical guide means comprising a vertical spindle, it is preferred for the two table units to be symmetrically disposed on different sides of the vertical transport path.

In an alternative preferred embodiment the conveying apparatus likewise comprises two identical table units. The vertical guide means comprises an endless chain or belt, such as, e.g., a toothed belt, guided around and meshing with two rotatable gears which are fixed to the conveying apparatus and are spaced from each other in the vertical direction of the cargo unit in such a manner, that the endless chain or belt is arranged in a loop comprising two straight sections in which the endless chain or belt extends parallel to the vertical direction of the cargo unit. Each of the two table units is secured to the endless chain or belt in another one of the two straight sections and each of the straight sections defines the vertical transport path for the respective table unit. At least one of the two rotatable gears is drivable by the vertical drive means to thereby selectively drive the endless chain or belt to move along the loop in the two opposite circulation directions. It is evident that due to the above construction, upon operation of the vertical drive means for both circulation directions the two table units move in opposite directions along their respective vertical transport path.

This embodiment is particularly advantageous in case of storage rack arrangements which have different numbers of rack compartments in different rows at different vertical positions. This is for example a necessity when using many standard unit load devices, such as LD3 containers, which have a tapering section near their base plate. The possibility to simultaneously move the table units in front of rack compartments at different vertical positions provides for more flexibility and efficiency, because it becomes possible to simultaneously service rack compartments which could only be serviced one after the other by the same table unit in the case of table units always provided next to each other at the same vertical position. While it is also possible to provide for an independent movement of the table units in the vertical direction, the present embodiment has the advantage of low constructional complexity, simple control and automatic balancing of the weight of the table units.

In a preferred embodiment each of the at least one table unit comprises two elongate retaining elements extending parallel to each other and in a direction perpendicular to the horizontal transport path and the vertical transport path and adapted for supporting an object. The retaining elements may preferably be rails which are also operable for guiding movement of objects, such as the receptacles, onto and from the table unit. The at least one table unit further comprises a retaining element drive means coupled to the retaining elements. It is adapted such that under control by the control unit it is operable to move at least one of the two retaining elements perpendicularly to its direction of extension towards and away from the other of the two elongate elements in order to selectively clamp or release an object between the two retaining elements. This provides for a simple construction, but nevertheless ensures that objects do not unintentionally shift and are not dropped during conveying. In a preferred embodiment the retaining element drive means comprises an electric motor, but it may alternatively or additional also include, e.g., pneumatic or hydraulic means. Further, it is preferred if the retaining element drive means provides an active or powered unclamping drive means, such as an electric motor or another drive means, such as a pneumatic or hydraulic means, adapted to effect the movement of at least one of the retaining elements in the direction away from the other retaining element, and a spring biased clamping means adapted to effect the movement of at least one of the retaining elements in the direction towards the other retaining element. The unclamping drive means is an active or powered means, and the clamping means is operated by spring means, so that, advantageously, in case of a failure of the unclamping drive means, e.g. due to a loss of power in the case of use of an electric motor, the retaining elements are moved in a clamping direction so that an object supported on the respective table unit is securely held on the table unit an cannot drop.

In a preferred embodiment each of the at least one table unit comprises a retraction and insertion device and a retraction and insertion device drive means adapted and arranged such that, after positioning the respective table unit in front of one of the rack compartments, upon operation of the retraction and insertion device drive means under control by the control unit the retraction and insertion device is operable to selectively retract an object from the respective rack compartment onto the respective table unit and support it thereon and insert an object supported on the respective table unit into the respective rack compartment. The retraction and insertion device drive means may preferably comprise one or more electric motors, but it may alternatively or additional also include, e.g., pneumatic or hydraulic means.

When combining the two preceding embodiments it is further preferred that in each of the at least one table unit the retraction and insertion device is disposed between the two retaining elements, and the two retaining elements each comprise a support surface facing in the vertical direction towards the upper cover and adapted for supporting an object retracted from a rack compartment in front of which the respective table unit is disposed or to be inserted into the rack compartment using the retraction and insertion device.

Regardless of whether or not the above embodiment, in which each of the at least one table unit comprises a retraction and insertion device and a retraction and insertion device drive means, is combined with the above embodiment, in which each of the at least one table unit comprises two elongate retaining elements, it is further preferred that the retraction and insertion device of each of the at least one table unit comprises a table conveyor device operable to move an object supported at least partially on the table unit in a guided manner selectively in two opposite directions perpendicular to the horizontal transport path and the vertical transport path. The term "table conveyor device" does not designate a conveyor device for conveying a table unit, but a conveyor device located on a table unit. Further, each rack compartment of each of the at least one storage rack arrangement comprises a rack compartment conveyor device operable to move an object disposed at least partially in the rack compartment in two opposite directions perpendicular to the horizontal transport path and the vertical transport path. The term "rack compartment conveyor device" does not designate a conveyor device for conveying a rack compartment, but a conveyor device located in or at a rack compartment.

In this embodiment drive means for the table conveyor device are provided as part of the retraction and insertion device drive means, but no drive means for the rack compartment conveyor devices are provided on or in the storage rack arrangements, i.e. the rack compartment conveyor devices are not operable without external drive means. These external drive means are provided as part of the retraction and insertion device drive means on the table units and can be selectively and releasably coupled to the rack compartment conveyor devices in order to drive the rack compartment conveyor devices. In this regard, the table units and their retraction and insertion device drive means are constructed such that in order to retract an object from a particular rack compartment onto a particular table unit or from the particular table unit into the particular rack compartment, the table unit can be positioned in front of the rack compartment, an external drive means being part of the retraction and insertion device drive means is operably coupled to the rack compartment conveyor device of the rack compartment, and the table conveyor device and the rack compartment conveyor device are driven by the retraction and insertion device drive means to effect the desired movement of the object. Due to the fact that no drive means for the rack compartment conveyor devices are provided on the storage rack arrangements, weight and complexity are significantly reduced and space inside the rack compartments is saved, thereby also reducing the overall system sensibility against tight tolerances and deviations in positioning and dimensioning.

In particular, the external drive means may be provided in the form of rack compartment conveyor device motors on the table units, which motors can be operably coupled to the rack compartment conveyor device of a rack compartment in front of which a table unit is disposed. In the coupled state the rack compartment conveyor device motors are operable to operate the rack compartment conveyor devices in the above-described manner, i.e. to move an object disposed at least partially in the rack compartment selectively in one of the two opposite directions perpendicular to the horizontal transport path and the vertical transport path. Thus, when suitably operating the respective table conveyor device, the table conveyor device and the rack compartment conveyor device form a single conveyor device operable to move objects between the table unit and the rack compartment.

More specifically, each rack compartment conveyor device comprises one or more first coupling elements, each adapted to be operably coupled to a mating second coupling element provided on or as part of a rack compartment conveyor device motor, which is part of the retraction and insertion device drive means. As already indicated above, the retraction and insertion device drive means of each of the at least one table unit comprises one or more table conveyor device motors operably connected to the table conveyor device such that the table conveyor device is operated by operating the one or more table conveyor device drive motors under the control of the control unit. Further, as likewise already indicated above, the retraction and insertion device drive means comprises one or more rack compartment conveyor device motors each comprising a second coupling element adapted to be selectively and releasably coupled to the first coupling elements of the rack compartment conveyor devices such that when one of the rack compartment conveyor devices is coupled in this manner to one of the rack compartment conveyor device motors the rack compartment conveyor device motor is operable to operate the respective rack compartment conveyor device.

The arrangement of the rack compartment conveyor devices and their first coupling elements and of the rack compartment conveyor device motors and their second coupling elements is such that a selected one of the table units can be positioned in front of a selected one of the rack compartments in such a manner that the second coupling element of at least one of the rack compartment conveyor device motors of the respective retraction and insertion device drive means is or can be releasably coupled to one of the first coupling elements of the rack compartment conveyor device of the respective rack compartment, and subsequently by operation of the retraction and insertion device drive means under control by the control unit the rack compartment conveyor device and the table conveyor device are operable to cooperate to move an object from the respective rack compartment through the access opening of the rack compartment onto the table unit and support it on the respective table unit and to release an object supported on the table unit and move it from the table unit through the access opening into the respective rack compartment.

In this embodiment, the rack compartment conveyor devices and their first coupling elements and the rack compartment conveyor device motors and their second coupling elements may be advantageously arranged such that the first and second coupling elements can be coupled or brought into operable engagement simply by suitably moving the selected table unit in front of the selected rack compartment and can be disengaged from each other simply by suitably moving the selected table unit away from the selected rack compartment. For example, it may be necessary to at first move the table unit in front of the rack compartment in slight misalignment in the direction of the horizontal transport path and to then move the table unit in a direction parallel to the horizontal transport path in order to establish coupling between the respective first and second coupling elements. The disengagement can be effected by reversing the above movement. In the alternative it is possible that the rack compartment conveyor device motors or at least their second coupling elements are movable to effect engagement and disengagement with the first coupling elements. For example, the second coupling element of a rack compartment conveyor device motor may be provided on a movable driven shaft of the motor.

Generally, it is preferred if a separate rack compartment conveyor device motor or at least a separate second coupling element is provided in each of the two end regions of the table units in a direction perpendicular to the vertical and horizontal transport paths.

The first and second coupling elements may preferably constitute a claw coupling or claw clutch.

The rack compartment conveyor device and the table conveyor device may each preferably comprise one or more conveyor belts or conveyor chains. In particular, each such conveyor belt or conveyor chain may be provided in the form of an endless conveyor belt or endless conveyor chain guided around and engaging two rotatable gears or rollers which are fixed to the respective rack compartment or to the respective table unit and are spaced from each other in a direction perpendicular to the vertical and horizontal transport paths in such a manner, that the endless belt or belt is arranged in a loop comprising between the gears or rollers a straight section on which an object can be transported in the direction perpendicular to the vertical and horizontal transport paths. Several of such belts or chains may be disposed next to each other and/or one behind the other. Further, one or more support means, e.g. comprising a roller arrangement or roller bar, may be provided on which the objects may slide in order to provide additional support for the objects during their movement. The first coupling elements may be provided on or as part of at least one of the gears or rollers of the conveyor belts or chains belonging to the rack compartment conveyor devices, and the table conveyor device motors may be operably coupled to at least one of the gears or rollers of the conveyor belts or chains belonging to of the table conveyor devices.

In order to retain an object on the belt or chain during transport and/or while being stored in a rack compartment or on a table unit, each belt or chain may comprise one or more engagement projections which constitute catchers and are adapted to suitably engage the objects to be transported or stored. The engagement projections may be adapted to engage mating engagement portions provided on the objects, but it is also possible to provide engagement projections which are operable to engage objects not being provided with specific mating engagement portions. In the latter case, it is possible to dispense with cage like constructions mentioned above and to store differently sized and shaped objects directly in the rack compartments. It should be noted that it is also possible to make use of toothed belts or to make use of chains and provide for objects, such as the above-mentioned receptacles, having engagement structures adapted to engage the chains.

In an alternative embodiment, in which no use is made of rack compartment conveyor devices and rack compartment conveyor device motors, and in which the above embodiment, in which each of the at least one table unit comprises a retraction and insertion device and a retraction and insertion device drive means, is combined with the above embodiment, in which each of the at least one table unit comprises two elongate retaining elements, it is further preferred that in each of the at least one table unit the retraction and insertion device is disposed between the two retaining elements, and the two retaining elements each comprise a support surface facing in the vertical direction towards the upper cover and adapted for supporting an object retracted from a rack compartment in front of which the respective table unit is disposed or to be inserted into the rack compartment using the retraction and insertion device. Moreover, after positioning an empty one of the table units in front of a rack compartment in which an object is stored, by operation of the retraction and insertion device drive means under control by the control unit the retraction and insertion device is operable to move, with respect to the retaining elements, towards the rack compartment into an engagement position, then engage an object stored in the rack compartment and having a predetermined engagement structure, and subsequently move away from the rack compartment together with the engaged object into a support position in which the object is supported at least partially on the support surface of at least one of the respective retaining elements. Similarly, after positioning one of the table units on which an object having a predetermined engagement structure is supported in front of an empty one of the rack compartments, by operation of the retraction and insertion device drive means under control by the control unit the retraction and insertion device is operable to move, with respect to the retaining elements, together with the object from the support position towards the rack compartment into a disengagement position, wherein the object is engaged by the retraction and insertion device, then disengage from the object after it is stored in the rack compartment by the operation of the retraction and insertion device, and subsequently move away from the rack compartment without the object into the support position. In this embodiment it is particularly preferred if the objects are the above receptacles, wherein each of the receptacles comprises the predetermined engagement structure.

In the latter embodiment it is further preferred that in each of the table units the retraction and insertion device comprises an endless chain, a chain support element on which the endless chain is movably supported in a loop, and a chain support element guide means having a fixed position with respect to the respective two retaining elements and adapted for supporting the chain support element and guiding its movement towards and away from a rack compartment. The endless chain is supported on the chain support element by means of at least two rotatable gears fixed to the chain support element and meshing with the endless chain. The loop comprises a straight section in which the endless chain extends parallel to the respective two retaining elements. The retraction and insertion device drive means is operable to selectively drive the endless chain to move along the loop in the two possible circulation directions.

According to this embodiment the retraction and insertion device, the endless chain and the retraction and insertion device drive means are arranged and adapted such that after positioning the respective table unit in front of a rack compartment under control by the control unit the retraction and insertion device drive means is operable to move the endless chain along the loop in a first circulation direction such that, in the engagement position of the retraction and insertion device, an object having the predetermined engagement structure and stored in the respective rack compartment is engaged by the endless chain and transported by the endless chain along the straight section towards the retaining elements while the retraction and insertion device is in the engagement position and/or moves from the engagement position to the support position. Similarly, after positioning the respective table unit in front of a rack compartment under control by the control unit the retraction and insertion device drive means is operable to move the endless chain along the loop in a second circulation direction opposite to the first circulation direction such that, while the retraction and insertion device is in the disengagement position and/or moves from the support position to the disengagement position, an object supported on the respective table unit and having the predetermined engagement structure is engaged by the endless chain and transported by the endless chain along the straight section towards the respective rack compartment and, in the disengagement position of the retraction and insertion device, eventually disengages from the endless chain. In this manner the range of required movement of the retraction and insertion device as a whole can be advantageously limited, and insertion and retraction of an object is greatly simplified.

In the latter embodiment it is further preferred the at least two gears movably supporting the endless chain on the chain support element comprises two gears around each of which the endless chain is partially looped, i.e. looped in such a manner that the endless chain changes its direction of extension, and which are idler gears. Additionally a driven gear driven by the retraction and insertion device drive means is provided, and the endless chain is partially looped around the driven gear also. The straight section of the loop extends between the two idler gears. Further, the retraction and insertion device drive means and the driven gear are fixed with respect to the retaining elements, i.e. do not change their position upon movement of the retraction and insertion device.

According to this embodiment the control unit is further adapted to operate the retraction and insertion device drive means such that after positioning the respective table unit in front of a rack compartment, for retracting an object stored in the respective rack compartment onto the respective table unit the movement of the retraction and insertion device to the engagement position is effected with the retraction and insertion device drive means locking the driven gear in a fixed position, in the engagement position of the insertion and retraction device the driven gear is driven to move the endless chain along the loop in the first circulation direction, and after the object has been transported at least partially along the straight section the movement of the retraction and insertion device to the support position is effected with the retraction and insertion device drive means locking the driven gear in a fixed position. Similarly, for inserting an object supported on the respective table unit into the respective rack compartment, the movement of the retraction and insertion device to the engagement position is effected with the retraction and insertion device drive means locking the driven gear in a fixed position, in the disengagement position of the insertion and retraction device the driven gear is driven to move the endless chain along the loop in the second circulation direction, and after the object has been transported at least partially along the straight section and disengaged from the endless chain the movement of the retraction and insertion device to the support position is effected with the retraction and insertion device drive means locking the driven gear in a fixed position. Thus, the driven gear is prevented from rotating during movement of the retraction and insertion device as a whole towards and away from the respective rack compartment, thereby preventing movement of the endless chain at the driven gear. Nevertheless, due to the fact that the retraction and insertion device drive means and, thus also the driven gear, are provided at a fixed position with respect to the retaining elements, due to the arrangement of the gears and due to the fact that the two idler gears move together with the retraction and insertion device the endless chain moves at the straight section in the suitable direction.

In this embodiment the retraction and insertion device drive means may comprise two separate motors for driving the driven gear and moving the retraction and insertion device, respectively. However, it is preferred that the retraction and insertion device drive means comprises only a single motor for driving both the driven gear and moving the retraction and insertion device and a clutch arrangement adapted for selectively disengaging the driven gear and the retraction and insertion device from the single motor. The latter arrangement is particularly simple and cost efficient.

In a preferred embodiment the gripping device mounting means comprises at least two spaced centering pins projecting from the gripping device mounting means towards the gripping device. Each of the centering pins comprises a tapered tip portion facing the gripping device and is mounted to be movable in the direction perpendicular to the floor structure and to be fixed against movement perpendicular to that direction. A centering pin drive means is provided and adapted for simultaneously moving the centering pins in their axial direction towards the gripping device into a locking position and away from the gripping device into an unlocking position. The gripping device comprises a carrier plate adjacent to the gripping device mounting means. For each of the centering pins a tapered recess is provided in a surface of the carrier plate facing the gripping device mounting means. The recesses are positioned such that upon movement of the centering pins into the locking position each of the centering pins enters an associated one of the recesses or enters further into the associated recess. Further, for each of the centering pins the tapered shape of its tip portion and the tapered shape of the associated recess match such that by operation of the centering pin drive means the centering pins are selectively moveable to be seated in the recesses in abutment against walls of the recesses, thereby moving the gripping device into the lift position and locking it therein, and to be out of contact with the walls of the recesses, thereby implementing the gripping state. This construction is particularly simple and reliable and can be readily implemented in the limited space available in vehicles. By suitably selecting the pins and recesses it is very easily possible to change the range of possible motion of the gripping device in its gripping state. In a preferred embodiment the centering pin drive means comprises an electric motor, but it may alternatively or additional also include, e.g., pneumatic or hydraulic means.

In a preferred embodiment the vehicle further comprising a gripping device support shaft extending between and secured to each of the gripping device mounting means and the gripping device. The gripping device support shaft is secured to the gripping device or the gripping device mounting device by means of a rotational bearing enabling relative rotation between the gripping device support shaft and the gripping device and the gripping device mounting device, respectively, and the gripping device support shaft is secured to the gripping device or the gripping device mounting device by means of a translational bearing enabling relative translational movement between the gripping device support shaft and the gripping device and the gripping device mounting device, respectively.

In a preferred embodiment each of the rack compartments comprises a releasable latch means for locking an object in the respective rack compartment and preventing retraction thereof. The latch means is adapted to be automatically released by the operation of one of the table units when it is positioned in front of it and operated to move an object from the respective rack compartment onto the respective table unit, and to automatically lock an object in the respective rack compartment when one of the table units positioned in front of it has been operated to move the object from the respective table unit into the respective rack compartment.

In the preceding embodiment, when combined with one of the embodiments comprising a movable retraction and insertion device, it is further preferred that each of the latch means comprises a latch lever supported on the respective storage rack arrangement to be pivotable between a latch position, in which a portion of it extends into the respective rack compartment, and a release position, in which the portion of the latch lever is moved out of the respective rack compartment. Moreover, it comprises a latch lever biasing means biasing the latch lever into the latch position thereof, a latch lever actuation element supported on the respective storage rack arrangement to be movable between an actuation position, in which it engages the latch lever in such a manner that the latch lever is moved to the release position against the action of the latch lever biasing means, and a deactivating position, in which it enables to latch lever to be in the latch position, and a latch lever actuation element biasing means biasing the latch lever actuation element into the deactivating position. The latch lever actuation element is arranged to be engaged by the retraction and insertion device upon movement of the retraction and insertion device into the engagement position and the disengagement position thereof in such a manner that the latch lever actuation element is positioned in the actuation position when the retraction and insertion device is positioned in the engagement position or the disengagement position thereof.

In a preferred embodiment in the passenger compartment the lift apparatus is disposed at least partially inside a galley or also another type of monument arranged in the passenger compartment.

Also it is generally preferred that the transport arrangement and/or each of the storage rack arrangements are provided as separate modules which can be selectively and individually removed from the cavity or from the remainder of the cargo unit as a whole and inserted into the cavity or cargo unit or arranged together with the remainder of the cargo unit. In particular, such a transport arrangement module comprises all drive means and, more particularly, all electrical means, hydraulic means and/or pneumatic means required for operating the transport arrangement and the conveying apparatus. By contrast, such storage rack modules are preferably passive modules without electrical means. This advantageously allows for simple maintenance and cleaning of the transport arrangement and the storage rack arrangements. Moreover, it is, for example, possible to remove only the storage rack modules from the vehicle for restocking them with objects, without having to remove the entire cargo unit. In this regard, it is possible that one or more of the modules are fixedly installed in the cargo compartment, preferably together with and coupled to the base plate, and that others of the modules are removable, preferably releasably coupled to the base plate.

BRIEF DESCRIPTION OF THE DRAWINGS

In the following an exemplary embodiment of the invention will be described in more detail with reference to the figures.

DETAILED DESCRIPTION

Figure 1:
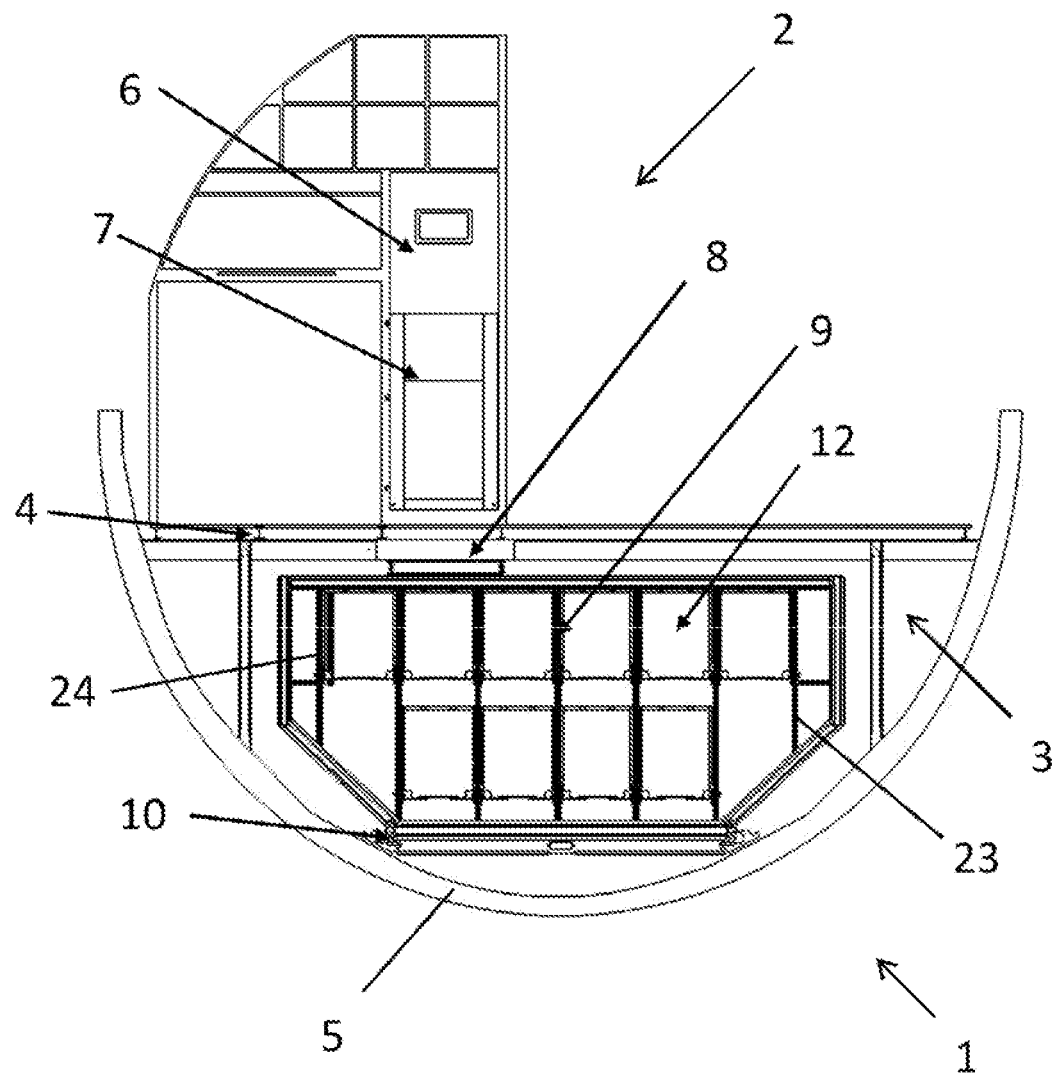
FIG. 1 shows a cross-sectional view of an aircraft comprising an aircraft galley and being constructed in accordance with an embodiment of the present invention.

The aircraft 1 shown in FIG. 1 in cross-section perpendicular to the longitudinal direction of the aircraft 1 comprises a passenger compartment 2 and a cargo compartment 3 separated by a planar floor structure 4. In the normal, intended operating position of the aircraft 1, the floor structure 4 is extending horizontally, perpendicular to the vertical direction. The outer skin 5 of the aircraft 1 is shown only partly in FIG. 1.

Inside the passenger compartment 2 a galley 6 is mounted on the floor structure 4. The galley 6 comprises, amongst others, a lift compartment 7 which is arranged immediately above and aligned with a through hole 8 selectively closeable by a hatch unit not shown in detail in FIG. 1. Inside the cargo compartment 3 a cargo unit in the form of a container 9 is disposed and secured in the position shown in FIG. 1 by means of a conventional cargo hold arrangement 10 with suitable latches. In the illustrated example the cargo container 9 has an outer shape and outer dimension identical to a conventional LD3 cargo container or unit load device.

However, it is also possible for the cargo container 9 to have other standard or non-standard shapes and dimensions.

Figure 3:
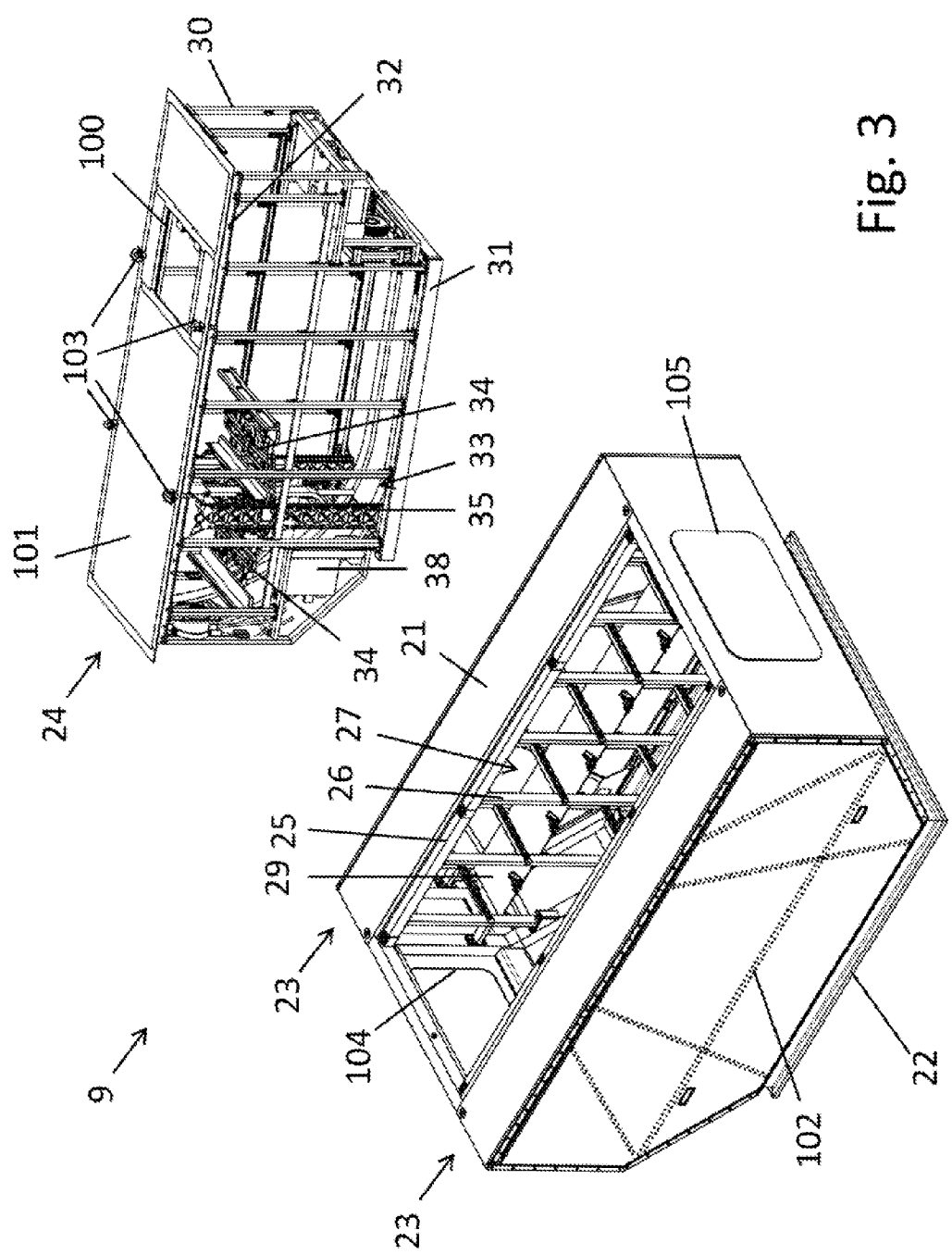
FIG. 3 shows the cargo container of FIG. 2 with the walls forming the outer housing and with a transport module removed from the container.

In any case, the cargo container 9 comprises in its upper wall 101 an aperture 100 (not shown in detail in FIG. 1, but see FIG. 3) located immediately below and in alignment with the aperture 8 in the floor structure 4. In the cargo container 9 two storage rack arrangements in the form of two separate storage rack modules 23 are disposed storing a plurality of service boxes 12, each including catering goods such as food and beverages. Further, a transport arrangement in the form of a transport module 24 is provided inside the cargo container 9 operable for selectively transporting service boxes 12 between the storage rack modules 23 and a predetermined position immediately below and adjacent to the aperture in the upper wall of the cargo container 9 (in Figure the transport module 24 and one of the two storage rack modules 23 are essentially covered by the other storage rack module 23 disposed along the sidewall of the cargo container 9 extending parallel to the plane of the drawing and facing towards the viewer). Thus, in case a particular service box 12 (more particularly the contents thereof) is needed by the crew in the passenger compartment 2, the transport module 24 may be operated to automatically transport the respective service box 12 to the predetermined position.

Inside the lift compartment 7 a lift arrangement is mounted comprising a lift apparatus adapted for vertically moving service boxes 12 from the predetermined position upwards into the lift compartment 7 and vice versa.

Figure 2:
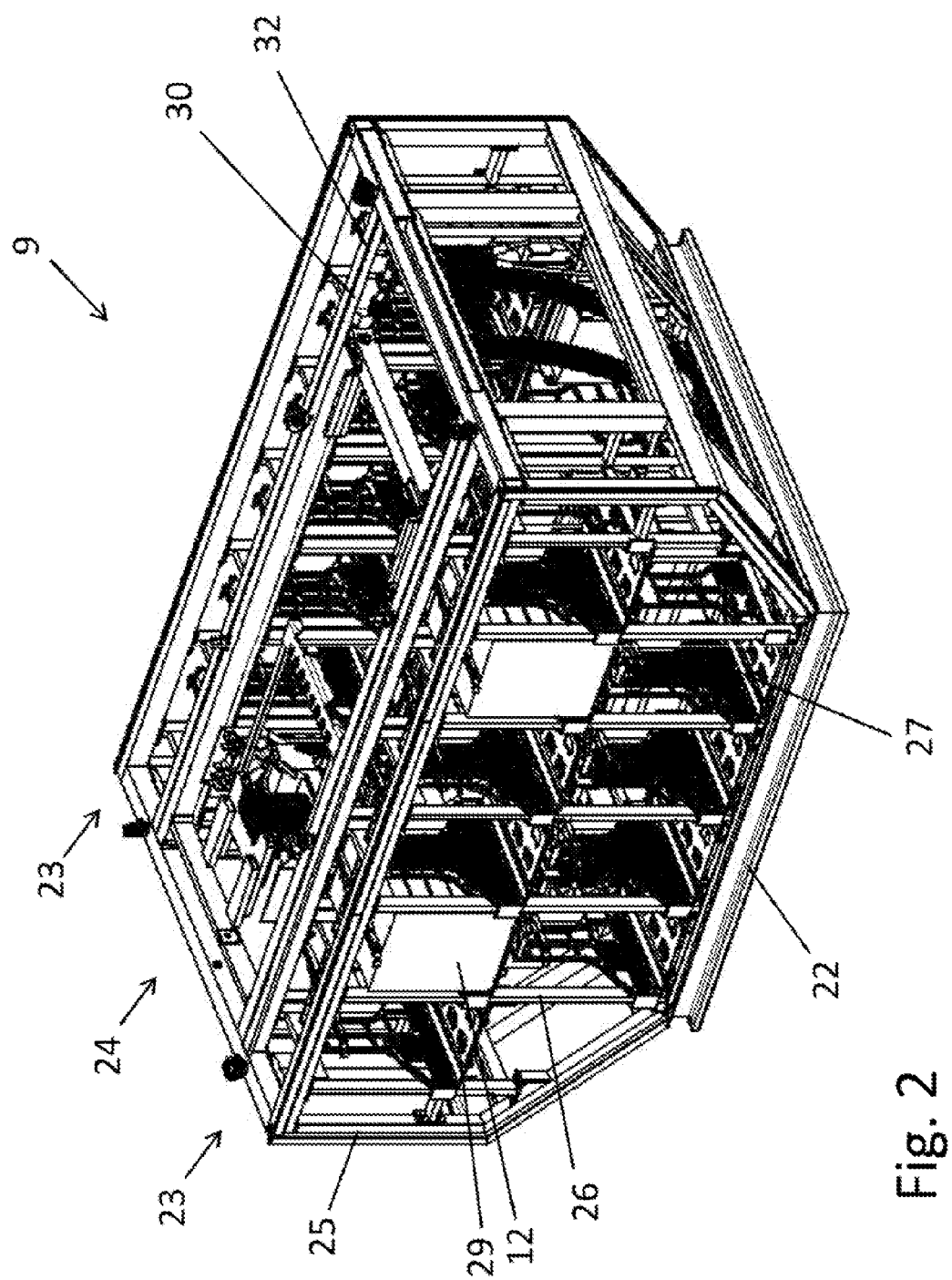
FIG. 2 shows a cargo unit in the form of a cargo container used as part of the vehicle shown in FIG. 1 with most of the walls forming the outer housing of the cargo container removed.

The cargo container 9 is shown in FIG. 2 without a large portion of its housing (which is visible in FIG. 3) and comprises a base plate 22, the two identical storage rack modules 23 and the transport module 24 disposed between the two storage rack modules 23. The storage rack modules 3 and the transport module 24 are each coupled to the base plate 22 and arranged side by side, wherein the transport module 24 is in abutment with the storage rack modules 23 on its two opposite sides. Preferably, the cargo hold arrangement 10 is adapted to releasably engage and hold the base plate 22. However, it is also possible that the base plate 22 (or also another portion of the cargo container 9) is fixedly installed in the cargo compartment 3. In that case, it is advantageous if the storage rack modules 23 and/or the transport module 24 are releasably coupled to the base plate 22, so that the storage rack modules 23 and/or the transport module 24 are selectively removable from the cargo container 9 and the cargo compartment 3. For example, in FIG. 3 the transport module 24 can be pulled upwardly out of the remainder of the cargo container 9 using eyelets 103. Similarly, it would be possible to fixedly install the storage rack modules 23 or another type of storage rack arrangement in the cargo compartment 3 and to provide the transport module 24 such that it can be releasably coupled to such storage rack arrangement or a suitable structure of the cargo compartment 3, or to fixedly install the transport module 24 or another type of transport arrangement in the cargo compartment 3 and to provide the storage rack modules 23 such that they can be releasably coupled to such transport arrangement or a suitable structure of the cargo compartment 3. In this manner maintenance of the transport module 24 or maintenance and restocking of the storage rack arrangements 23 is facilitated.

The housing of the cargo container 9 may include openings 104 closable by means of suitable elements 105. Such openings 104 may be advantageous for maintenance purposes.

The storage rack modules 23 each comprise a frame structure including an outer frame structure 25 and an inner frame structure 26 arranged inside the outer frame structure 25. The inner frame structure 26 provides a plurality of rack compartments 27 of identical shape and dimensions, each adapted for receiving and holding a receptacle 29 of predetermined shape and dimensions, which is in turn adapted for receiving and holding one of a plurality of service boxes 12. Thus, the receptacles 29 serve as adapters between the services boxes 12 and the rack compartments 27, thereby allowing for secure storage of service boxes 12 of different types in the rack compartments 27 and simple handling of such service boxes 12 by automatic means.

The rack compartments 27 include guide means (not specifically shown) for guiding the receptacles 29 into and out of the rack compartments 27 during insertion and removal thereof. The insertion and removal of the receptacles 29 and service boxes 12 held therein into and from the rack compartments 27 is possible at least at the side of the storage rack modules 23 facing the transport module 24 in the assembled condition shown in FIG. 2. However, it may be advantageous if the rack compartments 27 are also accessible from the opposite side, thereby facilitating restocking by inserting receptacles 29 and service boxes 12 held therein from that opposite side after temporarily removing, for example, at least a portion of the sidewall of the cargo container 9. In particular, for this purpose at least a portion of the sidewall can be provided in the form of a pivotable door assembly 102, which can be selectively opened and closed The transport module 24, which is shown in more detail in FIGS. 3 and 4, comprises a frame structure 30 including a rectangular base frame portion 31 and a rectangular upper frame portion 32. Inside the frame structure 30 an automatic conveying apparatus 33 is movably mounted so as to be movable in the direction parallel to the storage rack modules 23 in the assembled condition of the cargo container 9 illustrated in FIGS. 2 and 5.

Figure 4:
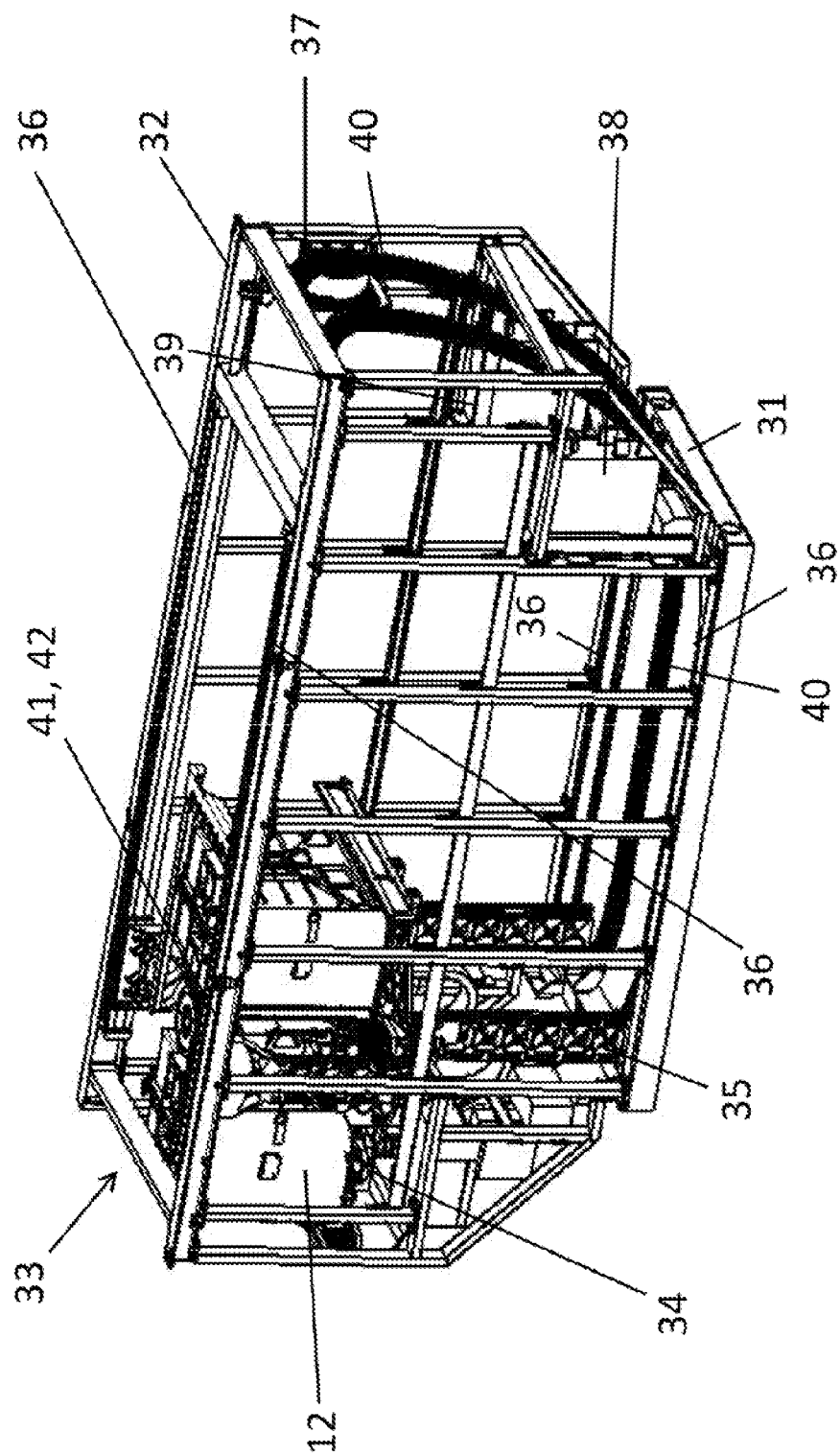
FIG. 4 shows a perspective view of the transport module of the cargo container of FIG. 3.
Figure 5:
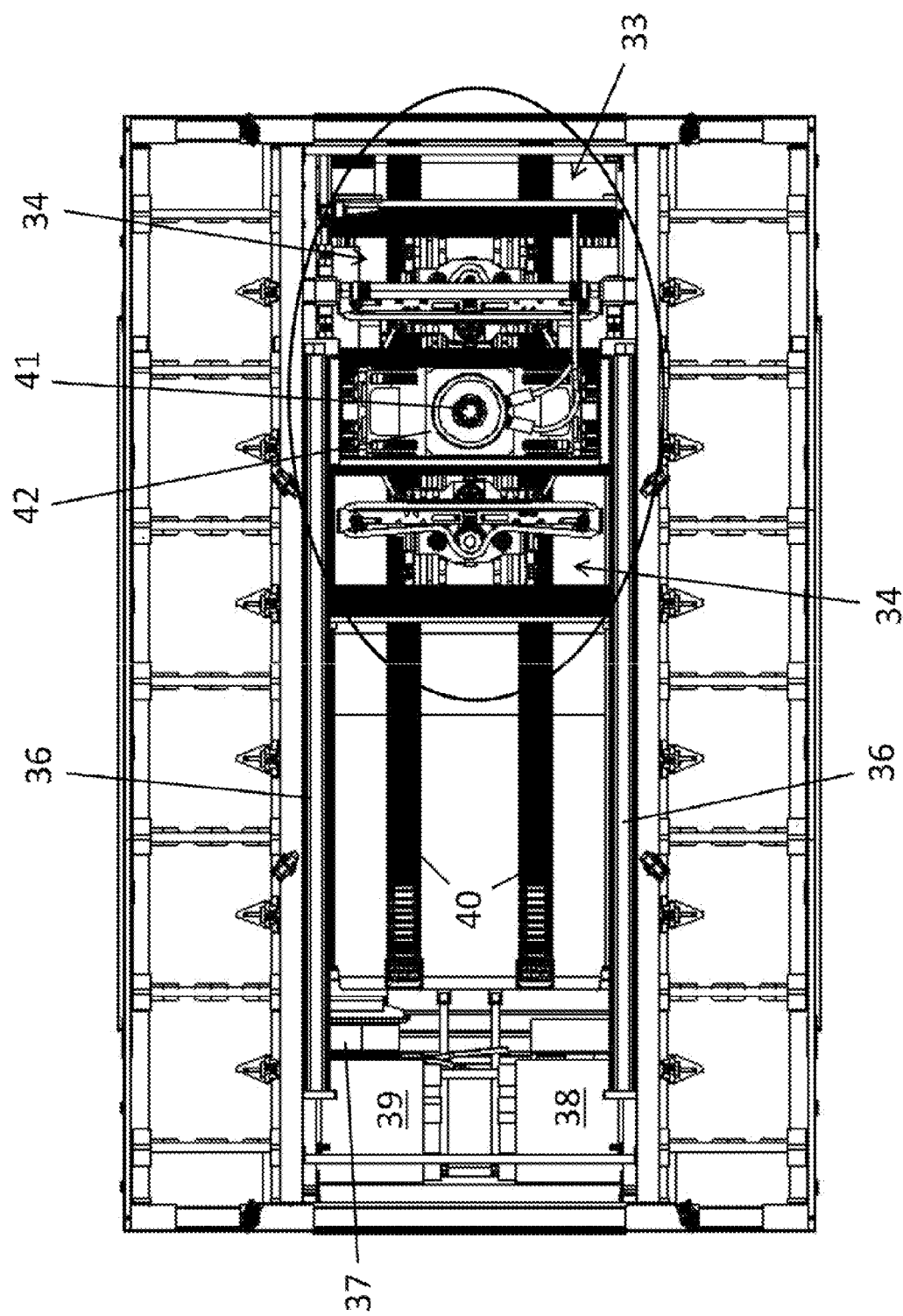
FIG. 5 shows a top plan view of the cargo container of FIG. 2 with the upper cover of the cargo container removed.

As best seen in FIGS. 4 and 5, for this purpose the conveying apparatus 33 comprises two table units 34 supported by a support structure 35. The support structure 35 is movably mounted to each of four straight rails 36 fixed to the inside of the longer portions of the base frame portion 31 and the upper frame portion 32 and extending parallel to these longer portions. Thus, the four rails 36 extend parallel to each other and in the horizontal direction and define a linear, straight horizontal transport path for the conveying apparatus 33 in its entirety. The conveying apparatus can be moved to each position along this horizontal transport path by means of an electric motor 37 and a control unit 38 controlling the electric motor. The electric motor 37, the control unit 38 and other electrical equipment 39 are connected among each other and with other electrical components described later-on by means of a harness 40, all of which form part of the transport module 24.

In the embodiment shown in FIGS. 4 and 5, the two table units 34 are rigidly connected to each other and are coupled together to a vertically extending spindle 41 rotatably supported to be selectively rotatable by an electric motor 42. The table units 34 extend perpendicularly to the spindle 41 and are disposed at the same height symmetrically on opposite sides thereof along the horizontal transport path (see FIG. 5). The coupling is such that upon rotation of the spindle 41 the table units 34 together move vertically upwards and downwards the spindle 41, which, thus, defines a straight linear vertical transport path for the table units 34. Consequently, the table units 34 can be moved to each position along this vertical transport path by means of the electric motor 42, which is likewise controlled by the control unit 38. It should be noted that the electric motor 42 could also be controlled by a separate control unit.

Due to the above arrangement the two table units 34 can be selectively moved to any position in the plane defined by the horizontal and vertical transport paths. In particular, in the assembled condition of the cargo container 9 it is possible to selectively position one of the two table units 34 in front of each of the rack compartments 27 of each storage rack module 23 with the respective table unit 34 aligned with the bottom of the respective rack compartment 27 such that a receptacle 29 stored in the rack compartment 27 can be horizontally moved from the rack compartment 27 onto the table unit 34 and vice versa.

Figure 9A:
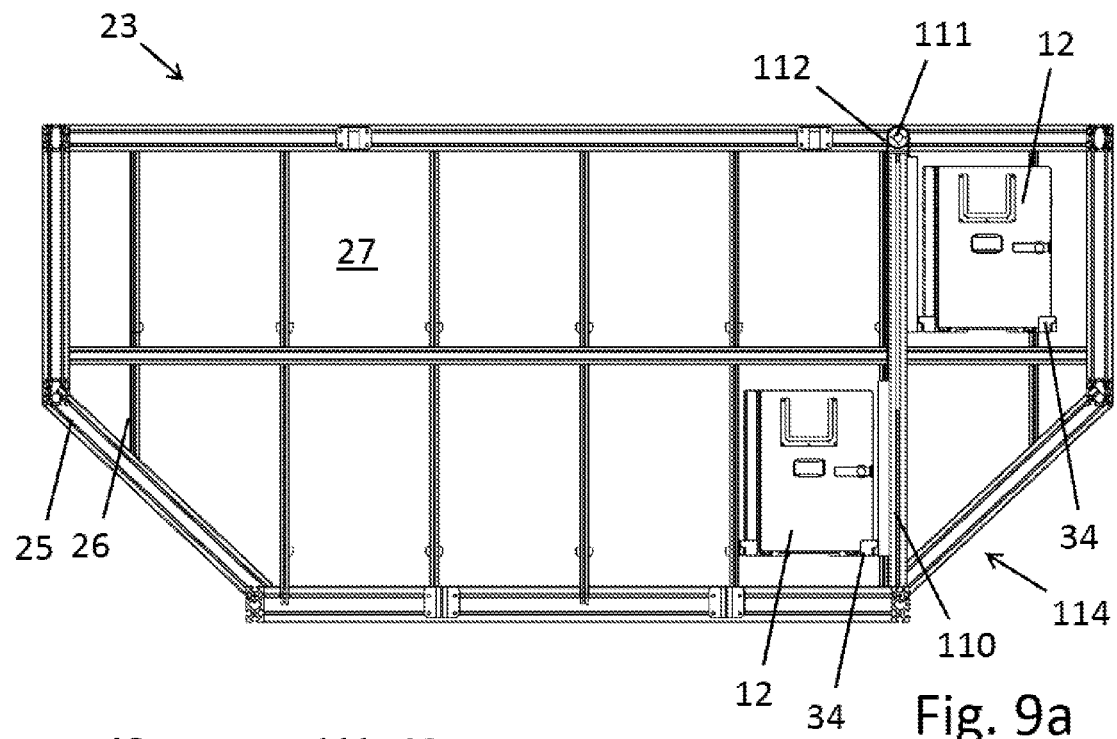
FIGS. 9a and 9b show schematic side views of a part of a further embodiment of a conveying apparatus forming part of a transport module.
Figure 9B:
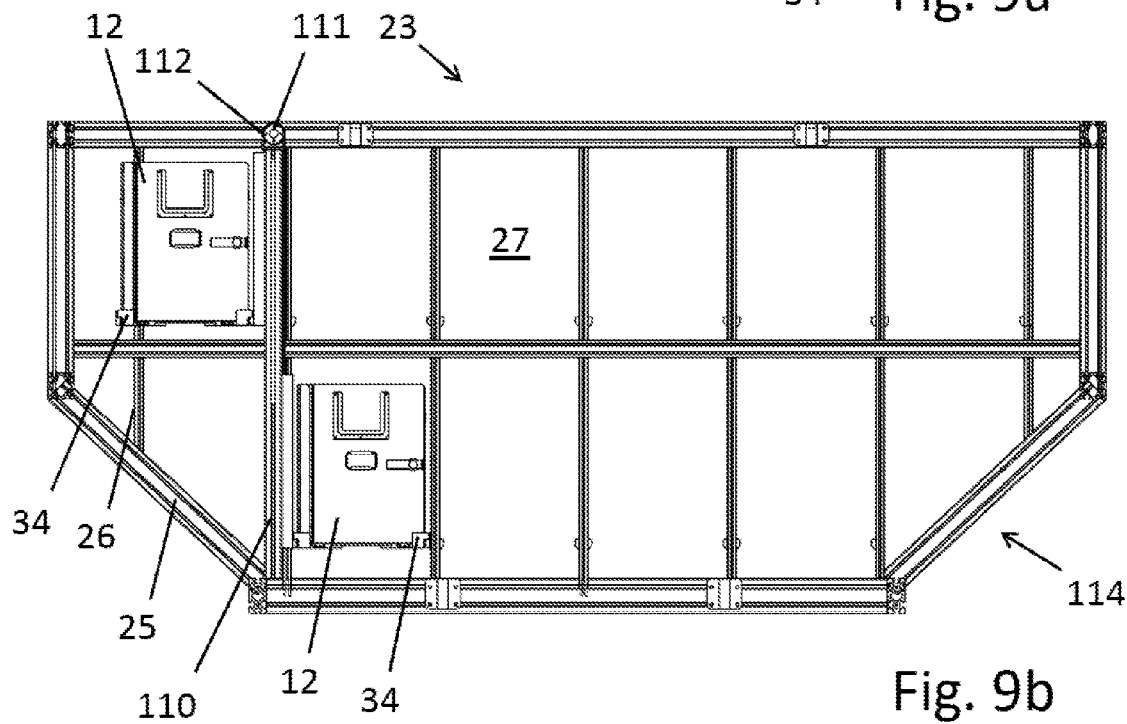
Figure 10:
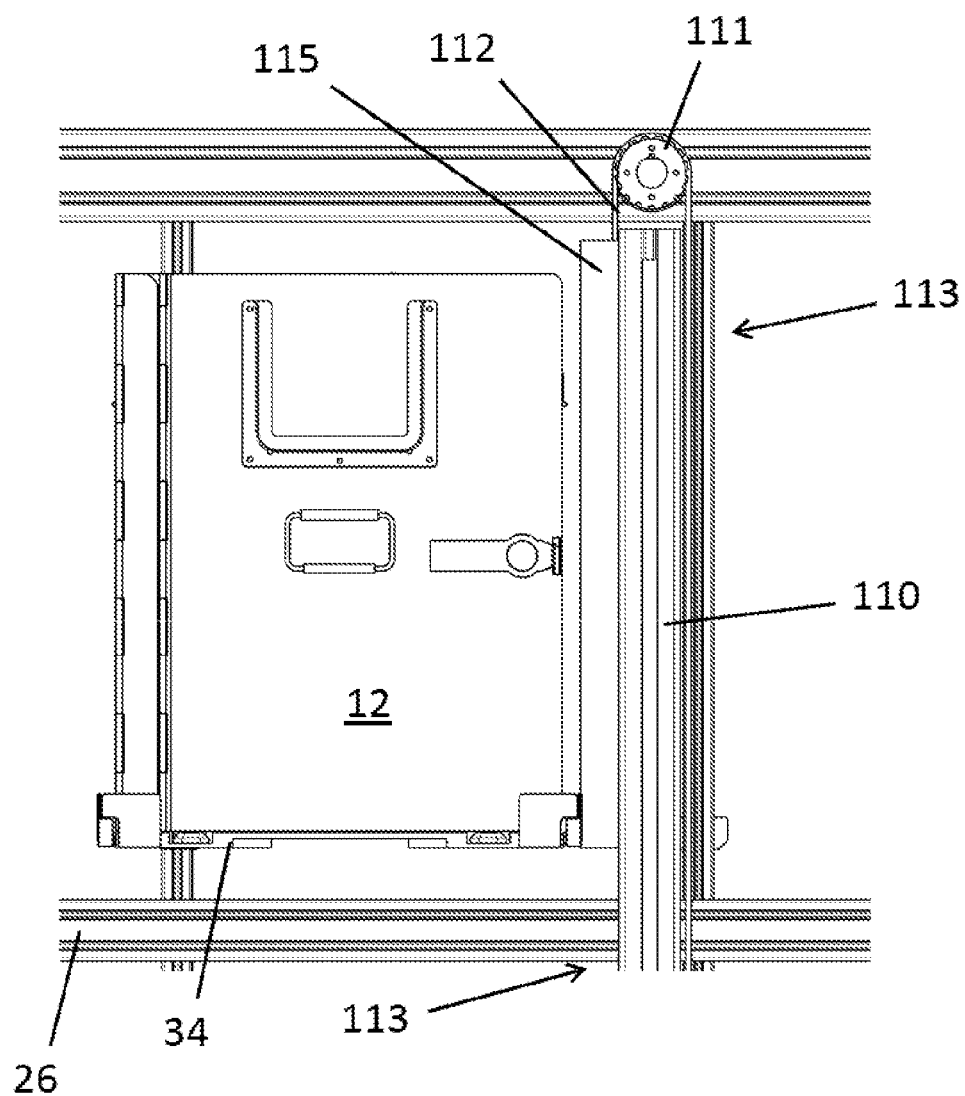
FIG. 10 shows an enlarged portion of FIGS. 9a and 9b.

An alternative embodiment of the automatic conveying apparatus 33 and of its two table units 34 is illustrated in FIGS. 9*a*, 9*b* and 10. FIGS. 9*a* and 9*b* show a side view of one of the storage rack modules 23 from the side on which the transport module 24 is located, and FIG. 10 shows an enlarged cutout of FIGS. 9*a* and 9*b*. The storage rack module 23 is the same as the one described above. For the purpose of illustration most of the transport module 24 has been left away in FIGS. 9*a*, 9*b* and 10, and only a part of the support structure 35 and the two table units 34 of the automatic conveying apparatus 33 are shown. In the present embodiment, the support structure 35 comprises a vertical bar or column 110 which is movable together with the remainder of the conveying apparatus 33 in the manner described above along the horizontal transport path (compare FIGS. 9*a* and 9*b*, in which the conveying apparatus 33 is moved from a rightmost position to a leftmost position), and which extends from the bottom to the top of the storage rack module 23. At each of the two opposite ends of the column 110 a respective gear 111 is rotatably mounted (only one of the gears 111 is visible in FIGS. 9*a* and 9*b*), and at least one of the two gears can be rotatably driven by a drive motor (not illustrated) which is provided as part of the conveying apparatus 33 and may be controlled by the control unit 38, or by a separate control unit, and powered by the electrical equipment 39, or by separate electrical equipment.

A toothed belt 112 is guided in an endless loop around the two gears 111 and meshes with the two gears 111. This endless loop comprises two elongate straight vertically extending sections 113, and each of the two table units 34 is secured to the toothed belt 112 in another one of the two straight sections 113. Further, the table units 34 are mounted to the column 110 by means of a coupling element 115 such that they are slidably guided along the column 110. As before, the table units 34 extend perpendicularly to the vertical direction (i.e. to the straight sections 113 of the loop), but they are only disposed at the same height symmetrically on opposite sides of the column 110 along the horizontal transport path if they are disposed in centrally with respect to the vertical height of the storage rack module 23 (this position is not shown in the Figures). When circulating the toothed belt 112 in a selected one of the two possible circulation directions, due to being secured to the toothed belt 112 at the opposite straight sections 113 the table units 34 move into opposite vertical directions and can thereby be selectively brought into the positions shown in FIGS. 9*a* and 9*b*. Each of the straight sections 113 of the loop formed by the toothed belt 112 defines a separate straight linear vertical transport path for the respective table units 34.

Consequently, under control of the control unit 38 each rack compartment 27 can be approached by at least one of the two table units 34. In the illustrated case, the storage rack module 23 is adapted to be disposed inside a standard LD3 container or a comparable container, which comprises different numbers of rack compartments in different rows or at different levels in the vertical direction. For example, standard LD3 containers comprise a bottom section in which it tapers in the downward direction, and the storage rack module 23 shown in FIGS. 9*a* and 9*b* consequently comprises a tapering bottom section 114 and, for example, four rack compartments 27 in a bottom row and six rack compartments 27 in a top row. Different from the embodiment in which the two table units 34 are always disposed at the same vertical level, it is advantageously possible to simultaneously insert or retract receptacles 29 into or from the two outermost rack compartments 27 in the two rows. Moreover, the support structure 35 can be of particularly simple construction.

It should be noted that—as will be explained below—it is generally also possible to provide for storing the service boxes 12 directly in the rack compartments 27, i.e. without being placed in one of the receptacles 29.

Figure 6A:
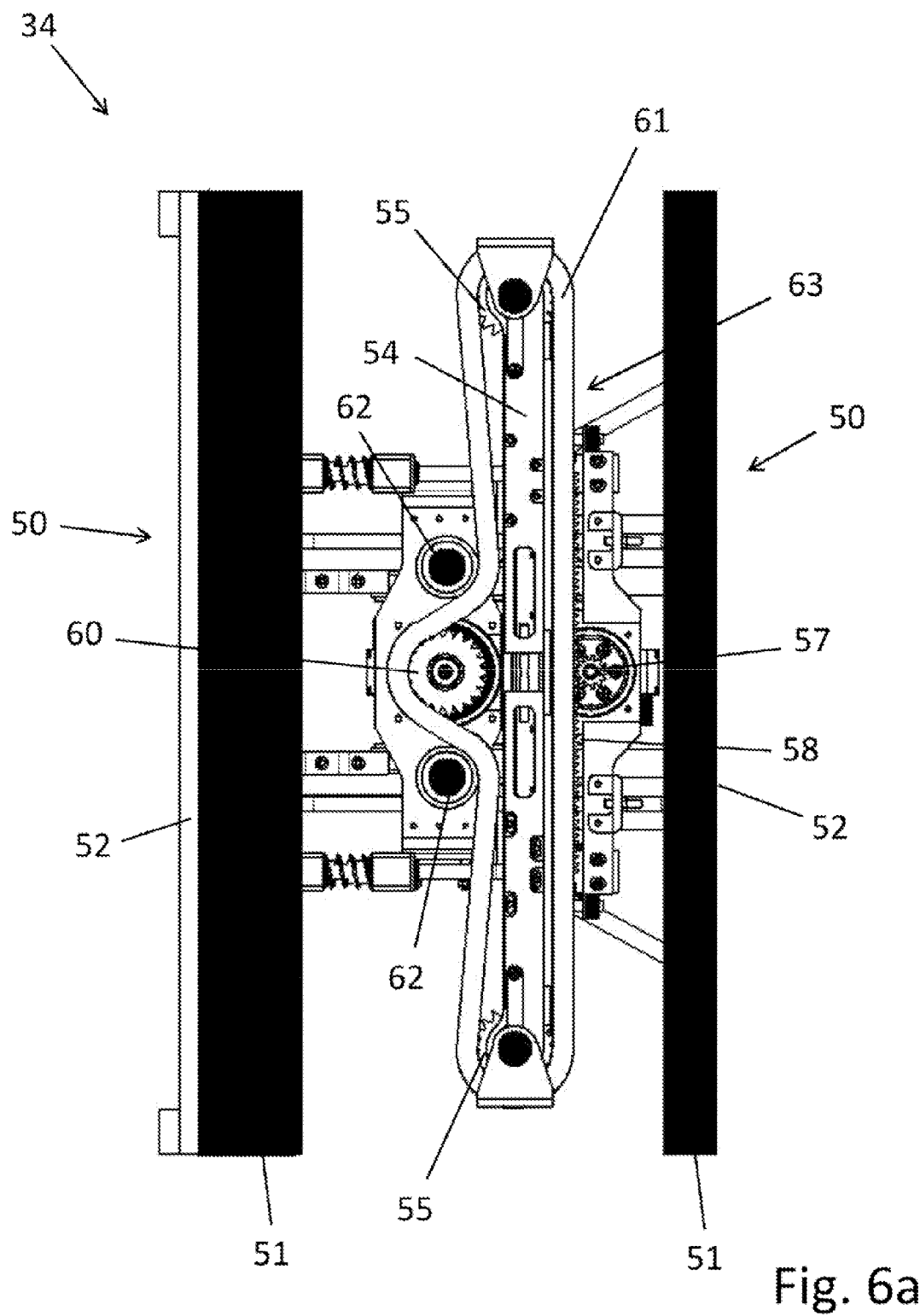
FIGS. 6a and 6b show a top plan view and a bottom plan view, respectively, of a table unit of a conveying apparatus forming part of the transport module of FIG. 4.
Figure 6B:
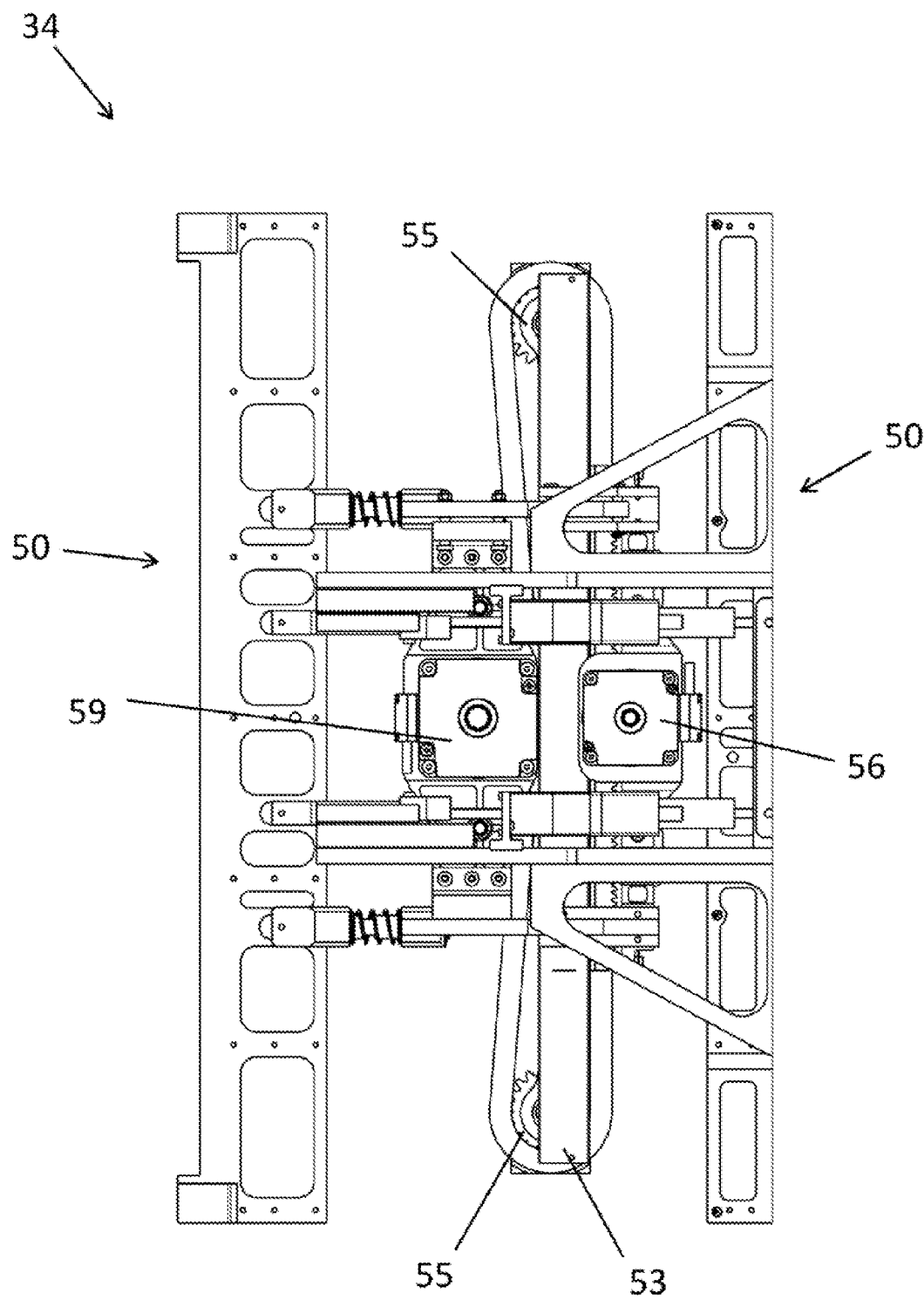
Figure 7A:
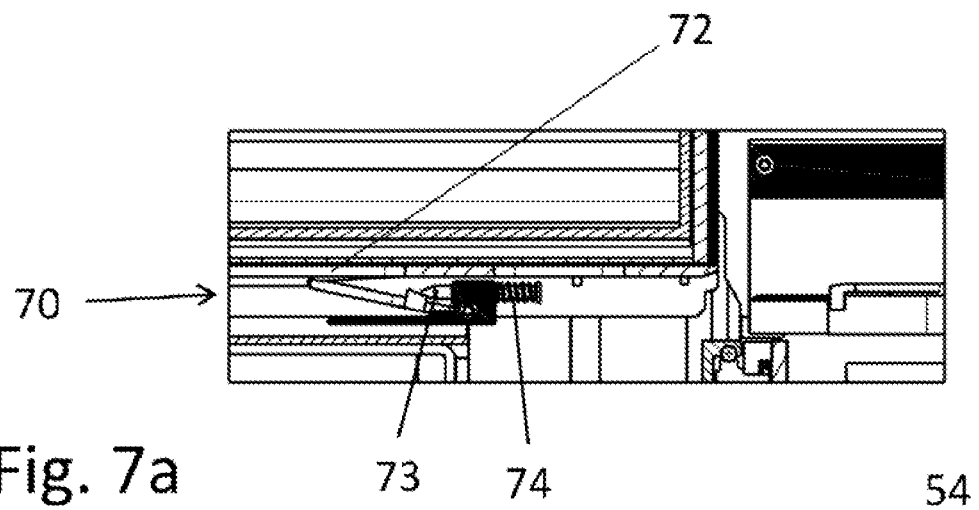
FIGS. 7a to 7d show schematic side views of a latch arrangement for locking rack compartments.
Figure 7B:
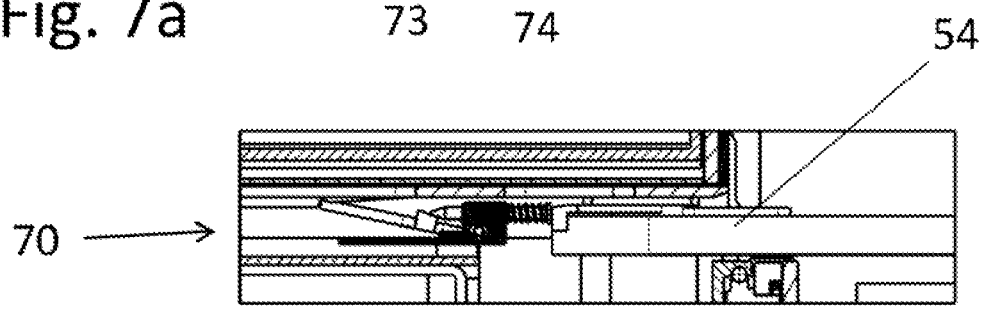
Figure 7C:
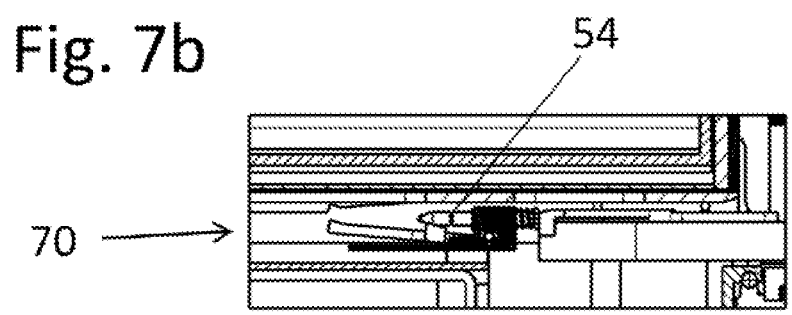
Figure 7D:
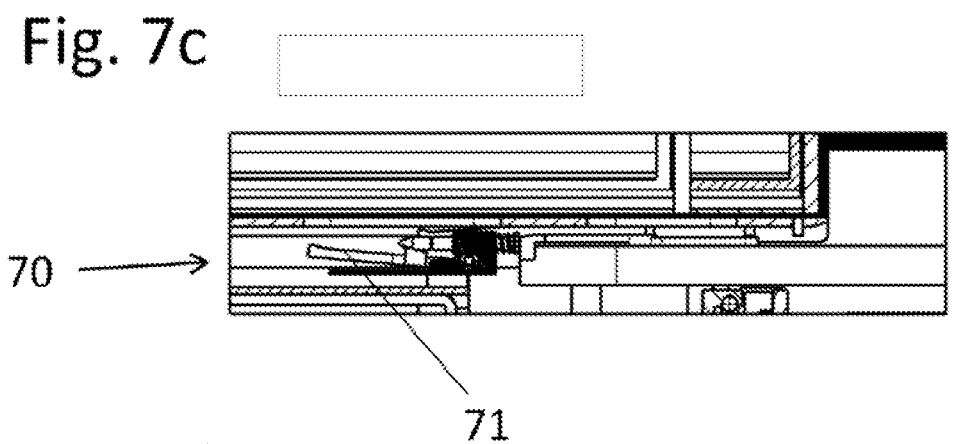

FIGS. 6*a* and 6*b* show a detailed top plan view and a detailed bottom plan view of one of the table units 34 according to one embodiment which may be used in any of the above embodiments. The table unit 34 comprises two parallel and spaced elongate and generally L-shaped retaining rails 50, each extending perpendicularly to the horizontal and vertical transport paths and providing an upper horizontal support surface 51 and a vertical, upwardly extending sidewall 52. The two retaining rails 50 are selectively movable towards and away from each other by means of a corresponding drive (not specifically illustrated), so that after supporting a receptacle 29 on the support surfaces 51 it can be selectively clamped between the retaining rails 50 and released from clamping engagement by the retaining rails 50 by moving them towards and away from each other, respectively. This ensures that the receptacles 29 are fixedly secured to the table units during transport inside the cargo container 9 and the transport module 24. Advantageously, the drive is only adapted for moving at least one of the retaining rails 50 away from the other retaining rail 50, and each retaining rails 50 drivable in this manner is spring biased towards the other retaining rail 50. In this manner, if the drive fails the retaining rails 50 is automatically brought into a clamping position fixedly securing any receptacle 29 currently handled by the respective table unit 34.

Mounted between the retaining rails 50 and extending parallel thereto is an elongate guide rail 53 which, in turn, supports an elongate element 54 on which two idler gears 55 are mounted at the two opposite longitudinal ends thereof. The guide rail 53 defines a straight linear path of movement for the elongate element 54, which extends parallel to the elongate guide rail 53 and is selectively movable in a guided manner along the path of movement by means of a first electric table motor 56 which rotationally drives a drive gear 57 meshing with a toothed rack arrangement 58 provided along one longitudinal side of the elongate element 54. The first electric table motor 56 is likewise controlled by the control unit 38.

Further, the table unit 34 comprises a second electric table motor 59 drivingly coupled to a driven gear 60 fixedly mounted with respect to the retaining rails 50 and the guide rail 53. An endless chain 61 is looped around the two idler gears 55, the driven gear 60 and two guide elements 62, and it meshes with each of the two idler gears 55 and the driven gear 60. The loop defined by the endless chain 61 comprises a straight section 63 extending between the two idler gears 55 at the side of and parallel to the toothed rack arrangement 58. The second electric table motor 59 is likewise controlled by the control unit 38.

It is to be noted that the first and second electric table motors 56, 59 could also be replaced by a single electric table motor and a clutch arrangement for selectively coupling the single table motor to the drive gear 57 and the driven gear 60.

The control unit 38 is adapted to control operation of the first and second electric table motors 56, 59 in such manner that when the drive gear 57 is rotated to move the elongate element 54 from the position shown in FIGS. 6a and 6b along the guide rail 53 towards a rack compartment 27 located on one of the two sides of the table unit 34 or to move the elongate element 54 from such an extended position back to the position of FIGS. 6a and 6b, the driven gear 60 is locked against rotation. Consequently, during such movement the chain 61 is fixed at the driven gear 60, but in the straight section 63 moves in the direction of movement of the elongate element 54. On the other hand, when the elongate element 54 is in one of its two extended positions, the driven gear 60 is driven to move the chain 61 along the entire loop, whereas the drive gear 57 is not rotated.

The receptacles 29 each comprise a projection (not shown) arranged such that it can be engaged by and disengaged from the chain 61 when the elongate element 54 is brought into its extended position extending slightly into the respective rack compartment 27.

More specifically, in order to move a receptacle 29 from a rack compartment 27 the table unit 34 is position in front of the rack compartment 27 in the manner indicated above. Then the elongate element 54 is moved from the position shown in FIGS. 6a and 6b to a position slightly extending into the rack compartment 27. Then, the chain 61 is circulated along the loop such that it moves away from the rack compartment 27 in the straight section 63 and, when doing so, the chain 61 engages the projection and moves it together with the remainder of the receptacle 29 out of the rack compartment 27 and onto the retaining rails 50. Then, the elongate element 54 is moved back into the position of FIGS. 6a and 6b, and, as explained above, during this movement the chain 61 continues to move away from the rack compartment 27 in the straight section 63. Once the position of FIGS. 6a and 6b is reached the receptacle is fully supported on the retaining rails 50. In order to move a receptacle 29 from the table unit 34 into a rack compartment 27, the above process is reversed.

In order to ensure that receptacles 29 are securely stored in the rack compartments 27 and are prevented from accidentally falling out of them each rack compartment 27 is provided with a latch arrangement 70 shown in FIGS. 7a to 7d. It comprises a lever 71 mounted to the rack compartment 27 to be pivotable between the locking position shown in FIGS. 7a and 7b and the release position shown in FIGS. 7c and 7d. In the locking position the lever 71 engages a recess 72 provided in the bottom of the receptacle 29, thereby preventing its movement out of the rack compartment 27. The lever 71 is biased into the locking position, and for moving it into the release position a spring biased pin 73 is provided, which is arranged such that it is engaged by a tip portion of the elongate element 54 in the extended position thereof and moved towards the lever 71 into the position shown in FIGS. 7c and 7d to move the lever 71 into the release position. Then, the receptacle 29 can be removed from the rack compartment 27 in the manner described above (see FIG. 7d). Upon retraction of the elongate element 54 the spring biased pin 73 returns to its position shown in FIGS. 7a and 7b and allows the lever 71 to return to its release position.

In an alternative embodiment of the table units 34 illustrated in FIGS. 11 to 14, each table unit 34 comprises two spaced roller bars 120 and two spaced endless toothed belts 121 located between the roller bars 120 and constituting table conveyor belts 121. The roller bars 120 and the toothed belts 121 extend in a direction perpendicular to the vertical and horizontal transport paths, i.e. in a direction perpendicular to the access openings of the rack compartments 27. The table unit 34 further comprises two electric table conveyor belt drive motors 122, each adapted for driving an associated one of the table conveyor belts 121 by rotatably driving one of two rotatable gears 123 around which the respective table conveyor belt 121 is looped (see FIG. 12).

Figure 11:
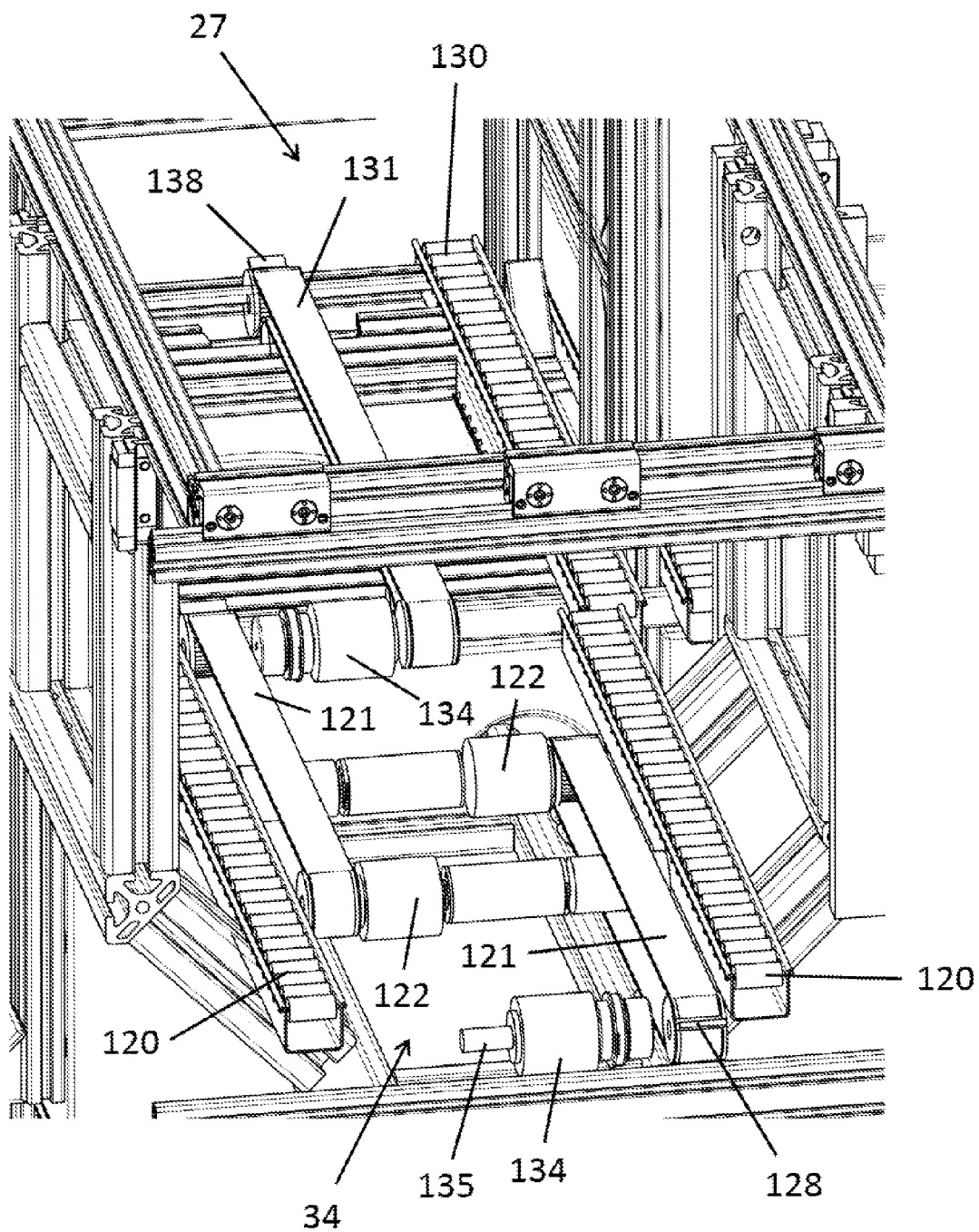
FIG. 11 shows a schematic perspective view of a further embodiment of a table unit arranged in front of a rack compartment.
Figure 12:
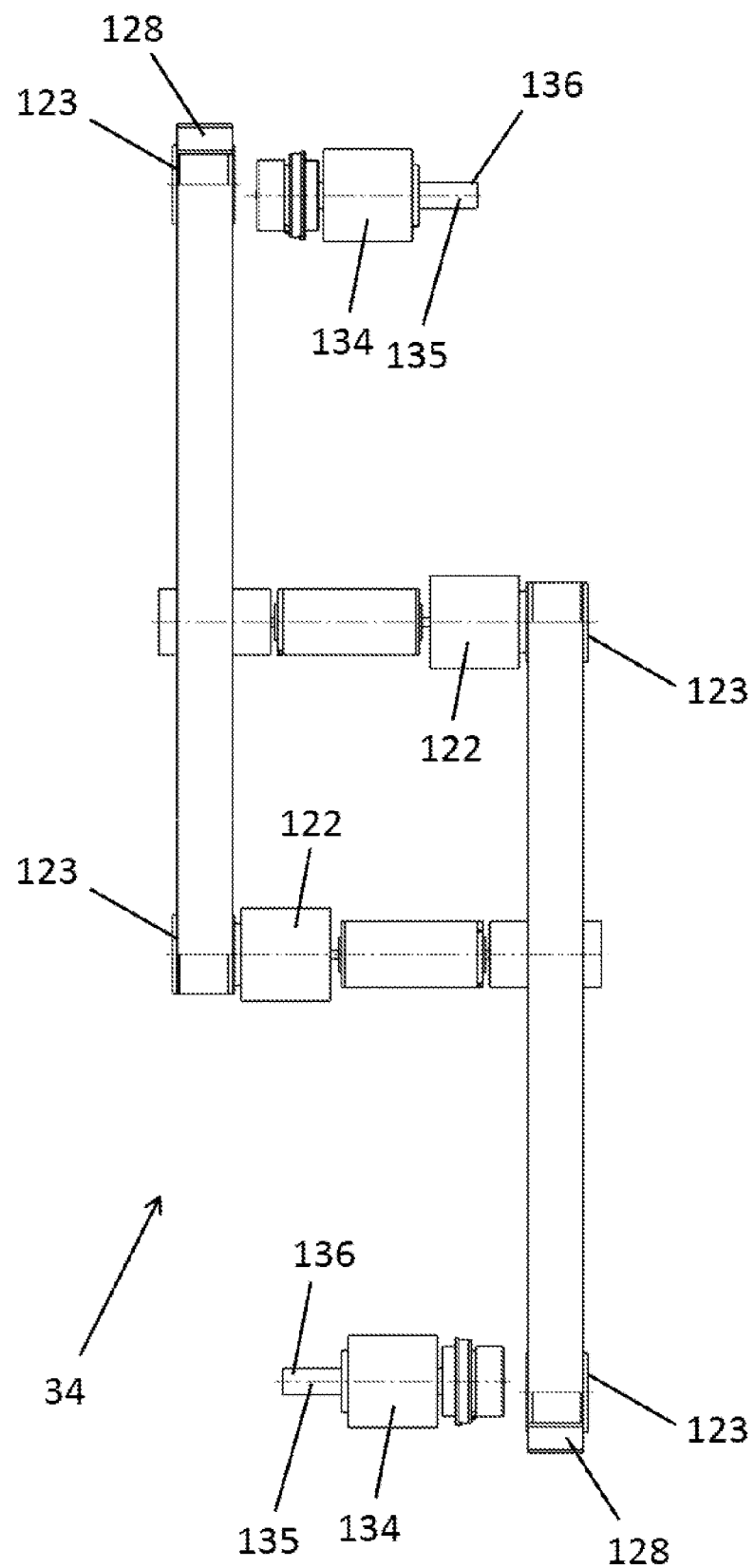
FIG. 12 shows a schematic top view of a conveyor belt arrangement forming part of the table unit of FIG. 11.
Figure 13:
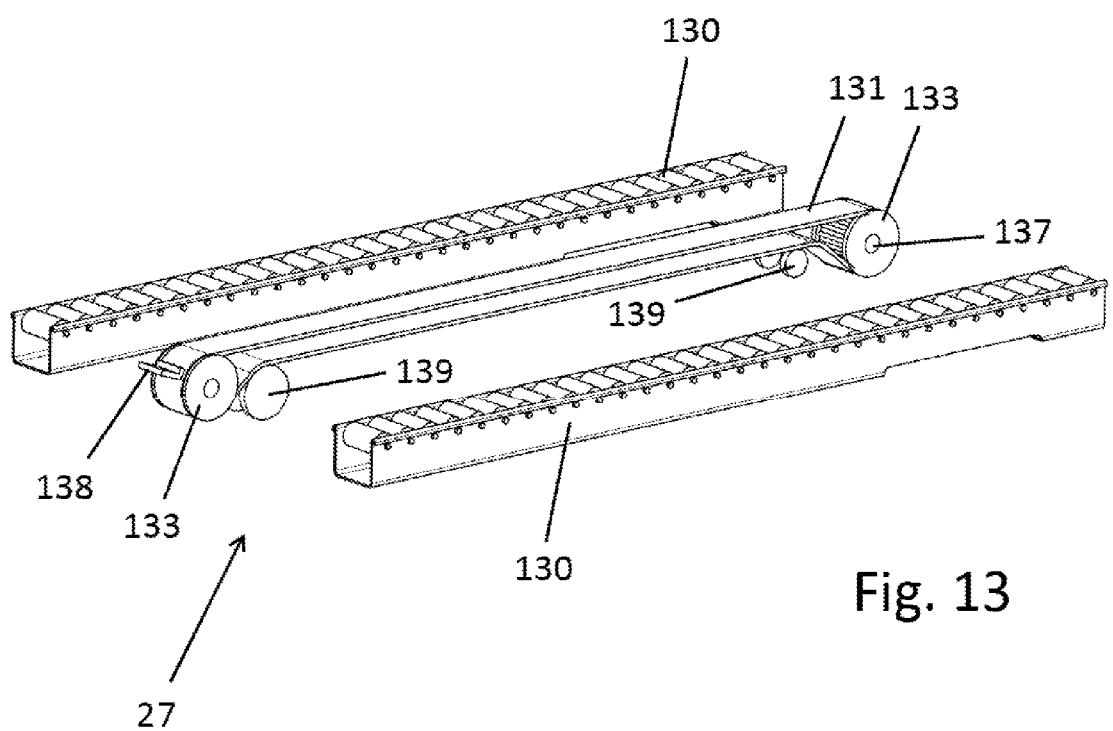
FIG. 13 shows a schematic perspective view of a conveyor belt arrangement forming part of the rack compartment of FIG. 11.
Figure 14:
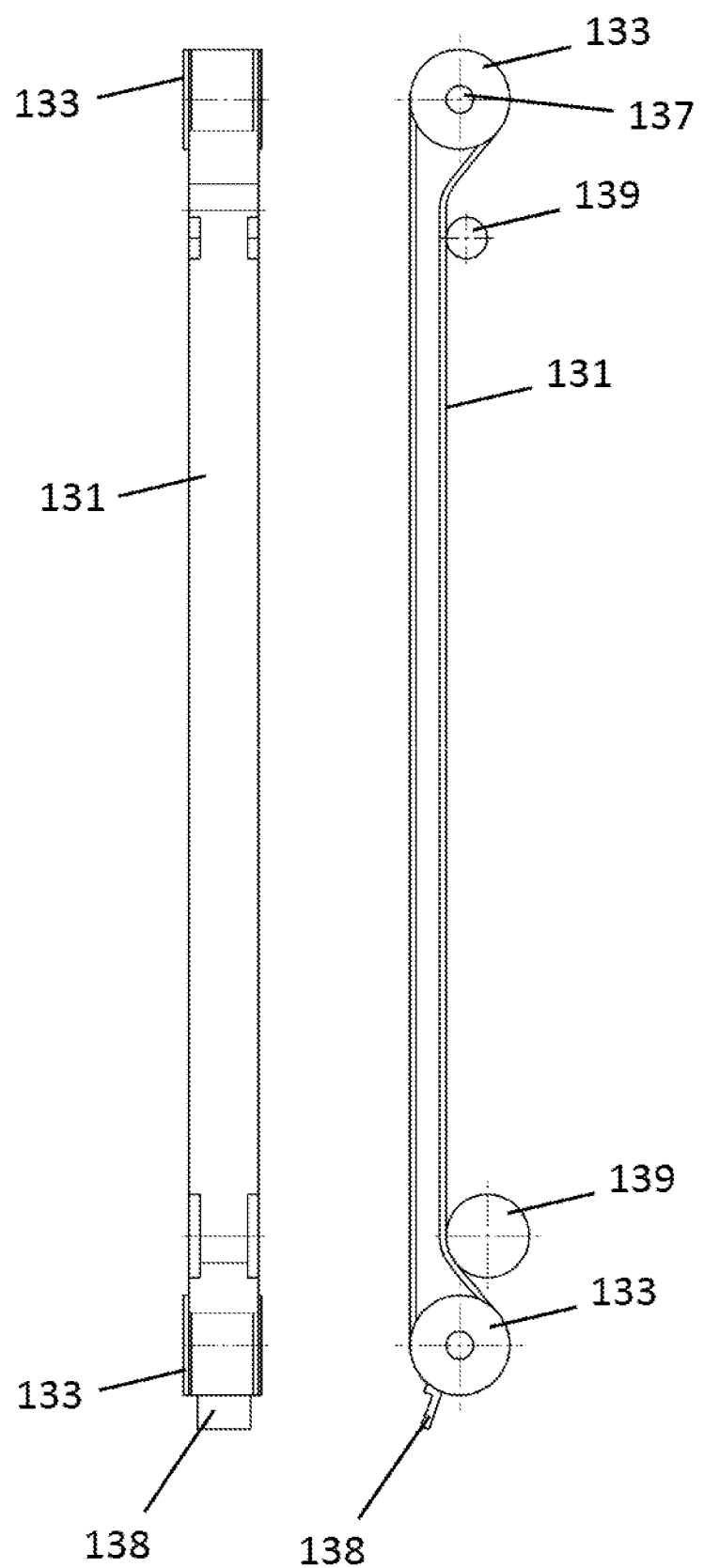
FIG. 14 shows schematic top and side views of the conveyor belt of FIG. 13.

In FIG. 11 the table unit 34 is shown disposed in front of a rack compartment 27. At the bottom of the rack compartment a further endless toothed belt 131 and two further spaced roller bars 130 (only one is visible in FIG. 11, but both are visible in FIG. 13, which illustrates the toothed belt and the roller bars 130 in isolation) are mounted. The toothed belt 131, which constitutes a rack compartment conveyor belt 131, is located between the two roller bars 130, and the roller bars 130 and the conveyor belt 131 extend in a direction perpendicular to the vertical and horizontal transport paths, i.e. in a direction perpendicular to the access openings of the rack compartments 27. As can be seen best in FIGS. 13 and 14, which show a perspective view and top and side views, respectively, of the rack compartment conveyor belt 131, the endless toothed belt 131 is looped around two rotatable gears 133, one of which is located in the immediate vicinity of the access opening of the rack compartment 27. Two rollers 139, which may or may not be movable, are in contact with a bottom portion of the conveyor belt 131 in order to provide for tension adjustment (see FIGS. 13 and 14).

However, no motor or means for driving the gears 133 and the rack compartment conveyor belt 131 is provided in the rack compartment 27 or the storage rack module 23. Rather, an electric rack compartment conveyor belt drive motor 134 is provided at each of the two end portions of the table unit 34 viewed in the direction perpendicular to the vertical and horizontal transport paths and mounted to the table unit 34. Each of these rack compartment conveyor belt drive motors 134 comprises a shaft 135 extending in a direction parallel to the horizontal transport path and the access opening of the rack compartment 27 and being rotatably driven by the respective motor 134. The shaft 135 can be brought into operable engagement with the gear 133 in the vicinity of the rack compartment 27, either by moving the entire table unit 34 in a direction parallel to the horizontal transport path, by moving the motor 134 with respect to the table unit 34 or by moving the shaft 135. In the second of the three cases the motor 134 must be movable mounted to the table unit 34 and a suitable moving means must be provided, and in the third of the three cases the motor 134 must be suitably constructed. In FIG. 11 one of the two motors 134 is shown in engagement with a gear 133, and the other of the two motors 134 is shown disengaged from a gear 133.

The shaft 135 and the gear 133 are constructed such that upon being engaged with each other rotation of the shaft 135 is transferred to the gear 133 to effect rotation thereof and to thereby drive the respective rack compartment conveyor belt 131. For example, the shaft 135 and the gear 133 may comprise mating claw coupling elements 136 and 137.

In the coupled state depicted in FIG. 11, the rack compartment conveyor belt 131 and the table conveyor belts 121 are operable under the control of the control unit 38, or a separate control unit, to cooperate to move a receptacle 29 between the table unit 34 and the rack compartment 27. In order to secure the receptacles 29 on the conveyor belts 121 and 131, both during transport and while being stored on the table unit 34 and in the rack compartment 27, the conveyor belts 121 and 131 each comprise respective catching elements 128 and 138, respectively, which are adapted to selectively engage the receptacles 29.

In this regard, the catching elements 128 and 138 may advantageously provide for being able to utilize service boxes 12 directly, without having to dispose them in the receptacles 29 when storing them in the rack compartments 27. Thus, it should be noted that is also possible to provide for storing the service boxes 12 directly in the rack compartments 27, i.e. without being placed in one of the receptacles 29. In that case, in order to facilitate handling of the service boxes 12 by the gripping device 80, it may be provided that the service boxes 12 are disposed in receptacles 29 while being transported on the table units 34. Then, when moving a service box 12 from a rack compartment 27 onto a table unit 34, a receptacle 29 is disposed on the table unit 34 in advance, and during the above-described conveying from the rack compartment 27 onto the table unit 34 the service box 12 is moved into the respective receptacle 29. On the other hand, when moving a service box 12 from a table unit 34 into a rack compartment 27, during the above-described conveying from the table unit 34 into the rack compartment 27 the service box 12 is moved out of the respective receptacle 29. For those purposes, the receptacles 29, which may then be provided in considerably fewer numbers, may be constructed to have openings in their bottom walls allowing the roller bars 120 and the conveyor belts 121 including their catching elements 128 to engage the service box 12 while being conveyed into and being disposed inside the receptacle 29.

Figure 8A:
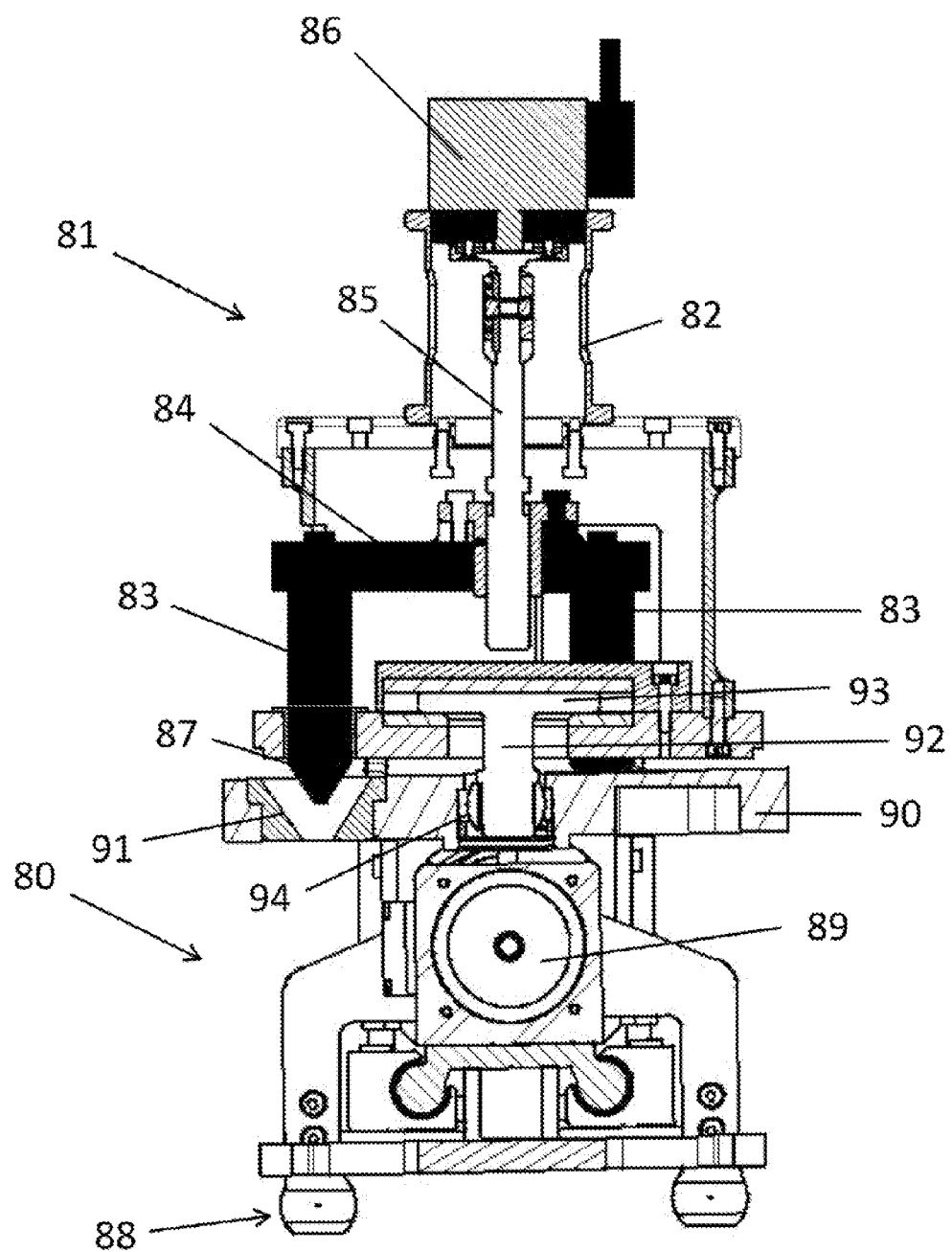
FIGS. 8a and 8b show schematic cross-sectional views of a gripping device and a gripping device mounting device in a gripping state and a lift state, respectively.
Figure 8B:
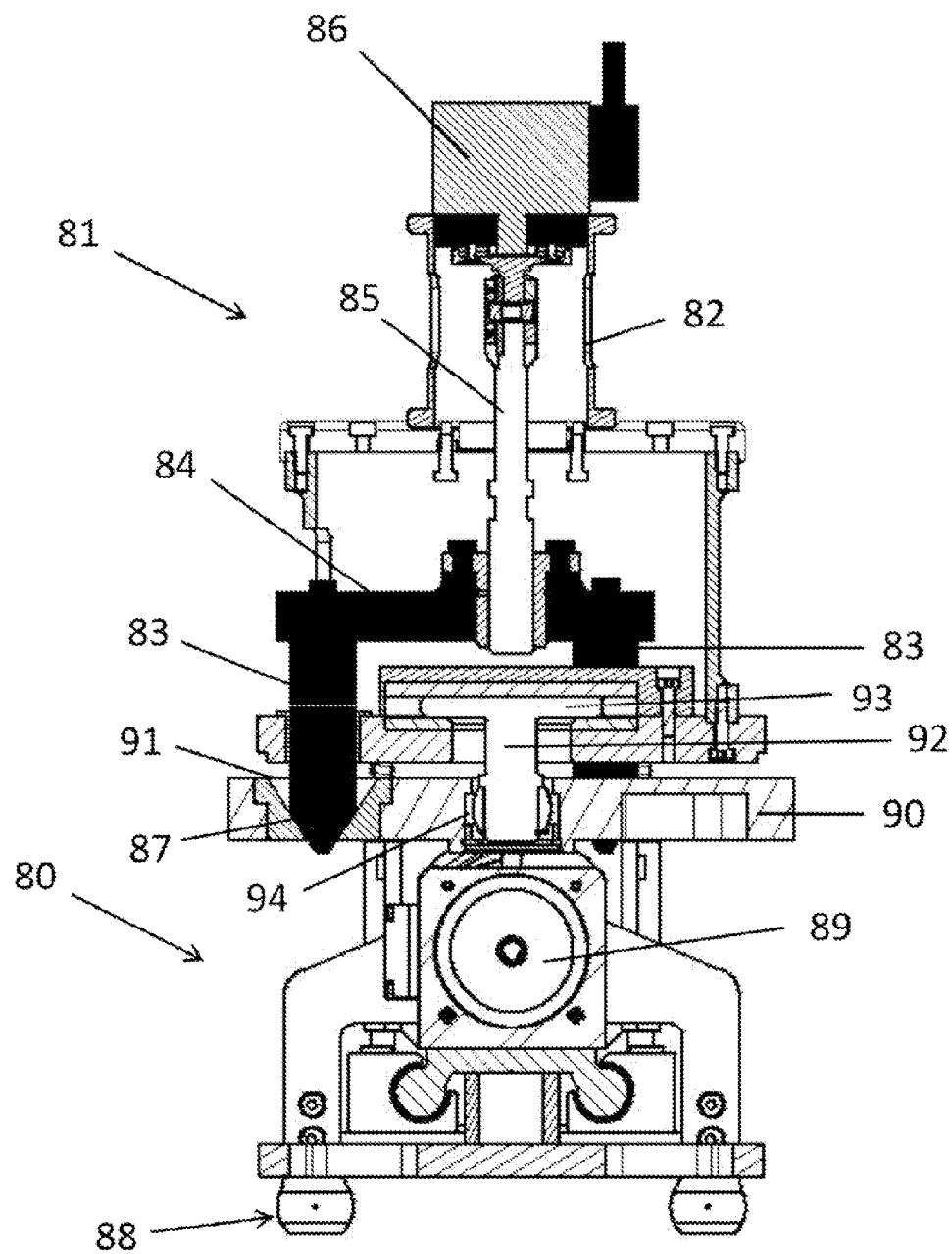

FIGS. 8a and 8b show a portion of the lift apparatus and more specifically a gripping device 80 suspended from a gripping device mounting device 81. The two devices 80, 81 together are moved vertically by the remainder of the lift apparatus between the cargo compartment 3 and the passenger compartment 2, as explained above.

The gripping device mounting device 81 comprises a housing 82, a plurality of centering pins 83 fixedly mounted on a common carrier plate 84 and a spindle 85 rotatable by an electric motor 86. The centering pins 83 extend vertically downwards from the carrier plate 84 and each have a tapered tip 87. By rotating the spindle 85 the carrier plate 84 can be selectively moved upwardly and downwardly together with the centering pins 83.

The gripping device 80 comprises a gripper 88 which is adapted for selectively gripping and releasing one of the receptacles 29 and is operated by an electric motor 89. The gripping device 80 further comprises an upper plate 90 in which a plurality of tapered recesses 91 are provided corresponding in number and position to the centering pins 83.

The gripping device 80 and the gripping device mounting device 81 are connected to each other by means of a shaft 92 provided at its upper end with a mounting plate 93. The mounting plate 93 is retained in a cavity provided in the gripping device mounting device 81 such that it is movable, together with the shaft 92, in the horizontal direction within certain limits. The shaft 92 is coupled to the upper plate 90 of the gripping device 80 by means of a ball bearing 94.

The ball bearing 94 and the shiftable support of the mounting plate 93 allow for a relative translational and rotational movement of the gripping device 80 with respect to the gripping device mounting device 81 within certain limits. This is illustrated in FIG. 8a in which the gripping device 80 is slightly rotated with respect to the gripping device mounting device 81. However, such "misalignment" is only possible if the tapered tip portions 87 of the centering pins 83 are not seated in the mating recesses 91, as in FIG. 8a. By moving the centering pins 83 until their tip portions 87 are seated in the mating recesses 91, the gripping device 80 can be brought into the predetermined relative position with respect to the gripping device mounting device 81 shown in FIG. 8b and locked in that position. Thus, in the condition of FIG. 8a the gripping device 80 and the gripping device mounting device 81 and, thus, the lift apparatus are able to compensate for misalignments between the cargo container 9 and the lift apparatus and misalignments of a receptacle 29 on a table unit 34. Once the receptacle 29 has been gripped by the gripper 88, the gripping device 80 can be brought into a defined position, thereby avoiding jamming during operation of the lift apparatus to move the receptacle 29 into the passenger compartment 2. Thus, the lift apparatus provides a self-aligning function.

The invention claimed is:

1. A vehicle comprising a passenger compartment and a cargo compartment disposed below the passenger compartment and separated from the passenger compartment by a floor structure having a through hole communicating the passenger compartment with the cargo compartment, the vehicle further comprising:
   a cargo unit comprising:
   a housing including a base plate, a sidewall arrangement extending from the base plate and an upper cover and defining an interior cavity, wherein the base plate defines a horizontal plane of the cargo unit and extends perpendicularly to a vertical direction of the cargo unit, and the upper cover includes an access aperture;
   at least one storage rack arrangement disposed in the cavity and adapted for storing a plurality of objects;
   a transport arrangement disposed in the cavity and operable for selectively transporting objects between the storage rack arrangement and a predetermined transfer position in the cavity, wherein the transport arrangement comprises a conveying apparatus and a control unit adapted for automatically controlling and operating the conveying apparatus;
   a mounting means disposed in the cargo compartment and adapted for fixedly or releasably securing the cargo unit in a predetermined operating position inside the cargo compartment, in which the access aperture in the upper cover of the cargo unit is disposed adjacent to and in alignment with the through hole in the floor structure; and
   a lift apparatus comprising a gripping device suspended from a gripping device mounting means, wherein the lift apparatus is disposed at least partially in the passenger compartment and arranged and adapted such that the lift apparatus is operable to move the gripping device in a direction perpendicular to the floor structure and, when the cargo unit is secured by the mounting means in the operating position, to thereby convey objects in the direction perpendicular to the floor structure from the transfer position in the cargo unit through the access aperture in the upper cover and the through hole in the floor structure between the cargo compartment and the passenger compartment and vice versa, wherein the transport arrangement comprises a horizontal guide means defining a linear horizontal transport path extending perpendicularly to the vertical direction of the cargo unit and supporting the conveying apparatus such that the conveying apparatus is movable in a guided manner along the horizontal transport path, and a horizontal drive means operable for selectively moving the conveying apparatus along the horizontal transport path, wherein the conveying apparatus comprises at least one table unit adapted for supporting an object, a vertical guide means defining a linear vertical transport path extending parallel to the vertical direction of the cargo unit and supporting the at least one table unit such that the at least one table unit is movable in a guided manner along the vertical transport path, and a vertical drive means operable for selectively moving the at least one table unit along the vertical transport path, wherein each of the at least one storage rack arrangement comprises a plurality of rack compartments each adapted for storing an object and having an access opening through which objects are insertable into and removable from the respective rack compartment, wherein the access openings are provided in an access side of the storage rack arrangement extending parallel to the horizontal transport path, wherein the transport arrangement is disposed facing the access side of each of the at least one storage rack arrangement in such a manner that by operating the horizontal and vertical drive means the at least one table unit is selectively movable in front of each of the rack compartments and operable to move an object from the respective rack compartment onto the at least one table unit and support the object on the at least one table unit and to release the object supported on the at least one table unit and move the object from the at least one table unit into the respective rack compartment, and wherein the gripping device can be selectively switched between a gripping state, in which, with respect to the gripping device mounting means, the gripping device is movable along and rotatable about two perpendicular axes each perpendicular to the direction perpendicular to the floor structure, and a lift state, in which the gripping device is locked in a predetermined lift position against movement with respect to the gripping device mounting means.

2. The vehicle according to claim 1, wherein
the at least one table unit and the gripping device are adapted to support objects and grip objects, respectively, in the form of receptacles having a predetermined shape and predetermined dimensions, and
in each of the at least one storage rack arrangement the rack compartments are of identical shape and dimensions and adapted to receive exactly one of the receptacles and support the respective receptacle in a predetermined position and orientation inside the respective rack compartment.

3. The vehicle according to claim 1, wherein the horizontal guide means comprises a guide rail arrangement and/or the vertical guide means comprises a rotatable spindle.

4. The vehicle according to claim 1, wherein the conveying apparatus comprises at least first and second identical table units disposed next to each other at the same vertical position, and the vertical drive means is adapted to synchronously move the at least first and second table units in the vertical direction.

5. The vehicle according to claim 1, wherein
the conveying apparatus comprises first and second identical table units,
the vertical guide means comprises an endless chain or belt guided around and meshing with first and second rotatable gears fixed to the conveying apparatus and spaced from each other in the vertical direction of the cargo unit in such a manner, that the endless chain or belt is arranged in a loop comprising first and second straight sections in which the endless chain or belt extends parallel to the vertical direction of the cargo unit, wherein each of the first and second table units is secured to the endless chain or belt in another one of the first and second straight sections and the straight sections define the vertical transport path for the respective table unit, and
wherein at least one of the first and second rotatable gears is drivable by the vertical drive means to thereby selectively drive the endless chain or belt to move along the loop in first and second opposite circulation directions, wherein in each circulation direction the first and second table units move in opposite directions along respective vertical transport paths thereof.

6. The vehicle according to claim 1, wherein each of the at least one table unit comprises:
first and second elongate retaining elements extending parallel to each other and in a direction perpendicular to the horizontal transport path and the vertical transport path and adapted for supporting an object; and
a retaining element drive means, wherein under control by the control unit the retaining element drive means is operable to move at least one of the first and second retaining elements perpendicularly to a direction of extension thereof towards and away from the other of the first and second elongate elements to selectively clamp or release an object between the first and second retaining elements.

7. The vehicle according to claim 1, wherein each of the at least one table unit comprises a retraction and insertion device and a retraction and insertion device drive means adapted and arranged such that, after positioning the respective table unit in front of one of the rack compartments, upon operation of the retraction and insertion device drive means under control by the control unit the retraction and insertion device is operable to selectively retract an object from the respective rack compartment onto the respective table unit and support the object thereon and insert an object supported on the respective table unit into the respective rack compartment.

8. The vehicle according to claim 6, wherein each of the at least one table unit comprises a retraction and insertion device and a retraction and insertion device drive means adapted and arranged such that, after positioning the respective table unit in front of one of the rack compartments, upon operation of the retraction and insertion device drive means under control by the control unit the retraction and insertion device is operable to selectively retract an object from the respective rack compartment onto the respective table unit and support the object thereon and insert an object supported on the respective table unit into the respective rack compartment, and
wherein in each of the at least one table unit the retraction and insertion device is disposed between the first and second retaining elements, and the first and second retaining elements each comprise a support surface facing in the vertical direction towards the upper cover and adapted for supporting an object retracted from a rack compartment in front of which the respective table unit is disposed or to be inserted into the rack compartment using the retraction and insertion device.

9. The vehicle according to claim 7, wherein
the retraction and insertion device of each of the at least one table unit comprises a table conveyor device operable to move an object supported at least partially on the table unit in a guided manner selectively in first and second opposite directions perpendicular to the horizontal transport path and the vertical transport path,
each rack compartment of each of the at least one storage rack arrangement comprises a rack compartment conveyor device operable to move an object disposed at least partially in the rack compartment in first and second opposite directions perpendicular to the horizontal transport path and the vertical transport path, wherein the rack compartment conveyor device comprises at least one first coupling element,
the retraction and insertion device drive means of each of the at least one table unit comprises:
at least one table conveyor device motor operably connected to the table conveyor device such that the table conveyor device is operated by operating the at least one table conveyor device motor under the control of the control unit; and
at least one rack compartment conveyor device motor comprising a second coupling element adapted to be selectively and releasably coupled to the first coupling elements of the rack compartment conveyor devices such that in the coupled state the respective rack compartment conveyor device motor is operable to operate the rack compartment conveyor device to the first coupling element of which the rack compartment conveyor device motor is coupled by means of its second coupling element,
wherein the table units can be positioned in front of the rack compartments in such a manner that the second coupling element of at least one of the rack compartment conveyor device motors of the respective retraction and insertion device drive means is or can be releasably coupled to one of the first coupling elements of the rack compartment conveyor device of the respective rack compartment, and subsequently by operation of the retraction and insertion device drive means under control by the control unit the rack compartment conveyor device and the table conveyor device are operable to cooperate to move an object from the respective rack compartment through the access opening of the rack compartment onto the table unit and support the object on the respective table unit and to release an object supported on the table unit and move the object from the table unit through the access opening into the respective rack compartment.

10. The vehicle according to claim 8,
wherein, after positioning an empty one of the table units in front of a rack compartment in which an object is stored, by operation of the retraction and insertion device drive means under control by the control unit the retraction and insertion device is operable to move, with respect to the retaining elements), towards the rack compartment into an engagement position,
then engage an object stored in the rack compartment and having a predetermined engagement structure, and
subsequently move away from the rack compartment together with the engaged object into a support position in which the object is supported at least partially on the support surface of at least one of the respective retaining elements, and
wherein, after positioning one of the table units on which an object having a predetermined engagement structure is supported in front of an empty one of the rack compartments, by operation of the retraction and insertion device drive means under control by the control unit the retraction and insertion device is operable to
move, with respect to the retaining elements, together with the object from the support position towards the rack compartment into a disengagement position, wherein the object is engaged by the retraction and insertion device,
then disengage from the object after the object is stored in the rack compartment by the operation of the retraction and insertion device, and
subsequently move away from the rack compartment without the object into the support position.

11. The vehicle according to claim 10, wherein in each of the table units the retraction and insertion device comprises:
an endless chain;
a chain support element on which the endless chain is movably supported in a loop by at least first and second rotatable gears fixed to the chain support element and meshing with the endless chain, wherein the loop comprises a straight section in which the endless chain extends parallel to the respective first and second retaining elements, and wherein the retraction and insertion device drive means is operable to selectively drive the endless chain to move along the loop in the two circulation directions; and
a chain support element guide means having a fixed position with respect to the respective first and second retaining elements and adapted for supporting the chain support element and guiding movement of the chain support element towards and away from a rack compartment,
wherein the retraction and insertion device, the endless chain and the retraction and insertion device drive means are arranged and adapted such that after positioning the respective table unit in front of a rack compartment, under control by the control unit the retraction and insertion device drive means is operable to move the endless chain along the loop in a first circulation direction such that, in the engagement position of the retraction and insertion device, an object having the predetermined engagement structure and stored in the respective rack compartment is engaged by the endless chain and transported by the endless chain along the straight section towards the retaining elements while the retraction and insertion device is in the engagement position and/or moves from the engagement position to the support position, and
under control by the control unit the retraction and insertion device drive means is operable to move the endless chain along the loop in a second circulation direction opposite to the first circulation direction such that, while the retraction and insertion device is in the disengagement position and/or moves from the support position to the disengagement position, an object supported on the respective table unit and having the predetermined engagement structure is engaged by the endless chain and transported by the endless chain along the straight section towards the respective rack compartment and, in the disengagement position of the retraction and insertion device, eventually disengages from the endless chain.

12. The vehicle according to claim 11, wherein the at least first and second gears movably supporting the endless chain on the chain support element comprises first and second idler gears around each of which the endless chain is partially looped, the vehicle further comprising:
   a driven gear driven by the retraction and insertion device drive means, the endless chain partially looped around the driven gear,
   wherein the straight section of the loop extends between the first and second idler gears,
   wherein the retraction and insertion device drive means and the driven gear are fixed with respect to the retaining elements, and
   wherein the control unit is adapted to operate the retraction and insertion device drive means such that after positioning the respective table unit in front of a rack compartment
   for retracting an object stored in the respective rack compartment onto the respective table unit
   the movement of the retraction and insertion device to the engagement position is effected with the retraction and insertion device drive means locking the driven gear in a fixed position,
   in the engagement position of the insertion and retraction device the driven gear is driven to move the endless chain along the loop in the first circulation direction, and
   after the object has been transported at least partially along the straight section the movement of the retraction and insertion device to the support position is effected with the retraction and insertion device drive means locking the driven gear in a fixed position, and
   for inserting an object supported on the respective table unit into the respective rack compartment
   the movement of the retraction and insertion device to the engagement position is effected with the retraction and insertion device drive means locking the driven gear in a fixed position,
   in the disengagement position of the insertion and retraction device the driven gear is driven to move the endless chain along the loop in the second circulation direction, and
   after the object has been transported at least partially along the straight section and disengaged from the endless chain the movement of the retraction and insertion device to the support position is effected with the retraction and insertion device drive means locking the driven gear in a fixed position.

13. The vehicle according to claim 12, wherein the retraction and insertion device drive means comprises:
   first and second separate motors for driving the driven gear and moving the retraction and insertion device, respectively, or
   a single motor for driving both the driven gear and moving the retraction and insertion device and a clutch arrangement adapted for selectively disengaging the driven gear and the retraction and insertion device from the single motor.

14. The vehicle according to claim 1, wherein the gripping device mounting means comprises:
   at least first and second spaced centering pins projecting from the gripping device mounting means towards the gripping device, wherein each centering pin comprises a tapered tip portion facing the gripping device and is mounted to be movable in the direction perpendicular to the floor structure and to be fixed against movement perpendicular to that direction, and
   a centering pin drive means adapted for simultaneously moving the centering pins towards the gripping device into a locking position and away from the gripping device into an unlocking position, and
   wherein the gripping device comprises a carrier plate adjacent to the gripping device mounting means, wherein
   for each of the centering pins a tapered recess is provided in a surface of the carrier plate facing the gripping device mounting means,
   the recesses are positioned such that upon movement of the centering pins into the locking position each of the centering pins enters an associated one of the recesses or enters further into the associated recess, and
   for each of the centering pins the tapered shape of tip portion thereof and the tapered shape of the associated recess match such that by operation of the centering pin drive means the centering pins are selectively moveable to be seated in the recesses in abutment against walls of the recesses, thereby moving the gripping device into the lift position and locking the gripping device therein, and to be out of contact with the walls of the recesses, thereby implementing the gripping state.

15. The vehicle according to claim 1, further comprising a gripping device support shaft extending between and secured to each of the gripping device mounting means and the gripping device, wherein
   the gripping device support shaft is secured to the gripping device or the gripping device mounting device by a rotational bearing enabling relative rotation between the gripping device support shaft and the gripping device and the gripping device mounting device, respectively, and
   the gripping device support shaft is secured to the gripping device or the gripping device mounting device by a translational bearing enabling relative translational movement between the gripping device support shaft and the gripping device and the gripping device mounting device, respectively.

16. The vehicle according to claim 1, wherein each of the rack compartments comprises a releasable latch means for locking an object in the respective rack compartment and preventing retraction thereof, wherein the latch means is adapted to
   be automatically released by the operation of one of the table units when it is positioned in front of it and operated to move an object from the respective rack compartment onto the respective table unit, and
   to automatically lock an object in the respective rack compartment when one of the table units positioned in front of it has been operated to move the object from the respective table unit into the respective rack compartment.

17. The vehicle according to claim 16, wherein, after positioning an empty one of the table units in front of a rack compartment in which an object is stored, by operation of the retraction and insertion device drive means under control by the control unit the retraction and insertion device is operable to
   move, with respect to the retaining elements), towards the rack compartment into an engagement position,
   then engage an object stored in the rack compartment and having a predetermined engagement structure, and subsequently move away from the rack compartment together with the engaged object into a support position in which the object is supported at least partially on the support surface of at least one of the respective retaining elements, and wherein, after positioning one of the table units on which an object having a predetermined engagement structure is supported in front of an empty one of the rack compartments, by operation of the retraction and insertion device drive means under control by the control unit the retraction and insertion device is operable to move, with respect to the retaining elements, together with the object from the support position towards the rack compartment into a disengagement position, wherein the object is engaged by the retraction and insertion device, then disengage from the object after the object is stored in the rack compartment by the operation of the retraction and insertion device, and subsequently move away from the rack compartment without the object into the support position, wherein each of the latch means comprises:

a latch lever supported on the respective storage rack arrangement to be pivotable between a latch position, in which a portion of the latch lever extends into the respective rack compartment, and a release position, in which the portion of the latch lever is moved out of the respective rack compartment, a latch lever biasing means biasing the latch lever into the latch position thereof, a latch lever actuation element supported on the respective storage rack arrangement to be movable between an actuation position, in which the latch lever actuation element engages the latch lever in such a manner that the latch lever is moved to the release position against the action of the latch lever biasing means, and a deactivating position, in which the latch lever actuation element enables to latch lever to be in the latch position, and a latch lever actuation element biasing means biasing the latch lever actuation element into the deactivating position, and wherein the latch lever actuation element is arranged to be engaged by the retraction and insertion device upon movement of the retraction and insertion device into the engagement position and the disengagement position thereof in such a manner that the latch lever actuation element is positioned in the actuation position when the retraction and insertion device is positioned in the engagement position or the disengagement position thereof.

18. The vehicle according to claim 1, wherein in the passenger compartment the lift apparatus is disposed at least partially inside a galley arranged in the passenger compartment.

* * * * *